United States Patent
Suzuki et al.

(10) Patent No.: US 12,392,939 B2
(45) Date of Patent: Aug. 19, 2025

(54) DIFFRACTION SHEET AND METHOD FOR MANUFACTURING THE SAME, THREE-DIMENSIONAL DISPLAY DEVICE, LIGHT BEAM REPRODUCTION DEVICE, THREE-DIMENSIONAL SPATIAL DISPLAY SYSTEM, LIGHT BEAM REPRODUCTION METHOD, AND PROGRAM

(71) Applicant: TOPPAN Inc., Taito-ku (JP)

(72) Inventors: Tsubasa Suzuki, Taito-ku (JP); Susumu Takahashi, Taito-ku (JP); Hideaki Honma, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 20 days.

(21) Appl. No.: 18/171,576

(22) Filed: Feb. 20, 2023

(65) Prior Publication Data

US 2023/0204832 A1 Jun. 29, 2023

Related U.S. Application Data

(63) Continuation of application No. PCT/JP2021/030292, filed on Aug. 19, 2021.

(30) Foreign Application Priority Data

Aug. 20, 2020 (JP) .................................. 2020-139079
Sep. 29, 2020 (JP) .................................. 2020-163317

(51) Int. Cl.
*G02B 5/18* (2006.01)
*G02B 5/20* (2006.01)
(Continued)

(52) U.S. Cl.
CPC ................ *G02B 5/18* (2013.01); *G02B 5/20* (2013.01); *G02B 5/32* (2013.01); *G02B 30/00* (2020.01);
(Continued)

(58) Field of Classification Search
None
See application file for complete search history.

(56) References Cited

U.S. PATENT DOCUMENTS 5,617,248 A 4/1997 Takahashi et al.
6,201,517 B1 3/2001 Sato
(Continued)

FOREIGN PATENT DOCUMENTS

JP H06-82612 A 3/1994
JP H07-287192 A 10/1995
(Continued)

OTHER PUBLICATIONS

International Search Report issued Nov. 9, 2021, in International Application No. PCT/JP2021/030292, filed Aug. 19, 2021, 11 pages (with English Translation).

(Continued)

*Primary Examiner* — Chikaodili E Anyikire
(74) *Attorney, Agent, or Firm* — Oblon, McClelland, Maier & Neustadt, L.L.P.

(57) ABSTRACT

A three-dimensional display device including a diffraction sheet including a transparent substrate, and a diffraction layer having a first diffraction pattern formed in a first array pattern and a second diffraction pattern formed in a second array pattern on the transparent substrate, the diffraction sheet measuring 10 inches or more in diagonal; one of a liquid crystal device having a plurality of pixels and a color filter having a plurality of types of color filters; and a light source. The first diffraction pattern and the second diffraction pattern are overlapped with the pixels or the color filters in a direction normal to the diffraction sheet with an amount of displacement being $1/10$ or less of a pitch of the pixels or the color filters.

11 Claims, 22 Drawing Sheets

(51) Int. Cl.
 *G02B 5/32* (2006.01)
 *G02B 30/00* (2020.01)
 *G03B 35/08* (2021.01)

(52) U.S. Cl.
 CPC ........ *G03B 35/08* (2013.01); *G02B 2207/117* (2013.01)

(56) References Cited

U.S. PATENT DOCUMENTS

| | | | |
|---|---|---|---|
| 6,377,295 B1 | 4/2002 | Woodgate et al. | |
| 10,522,784 B2* | 12/2019 | Kishimoto | H05B 33/10 |
| 10,747,107 B2* | 8/2020 | Singh | B29C 59/022 |
| 2009/0015918 A1 | 1/2009 | Morozumi et al. | |
| 2009/0052026 A1 | 2/2009 | Takagi et al. | |
| 2013/0038804 A1 | 2/2013 | Li et al. | |
| 2016/0077251 A1* | 3/2016 | Genda | G02B 5/189 359/576 |
| 2017/0176669 A1 | 6/2017 | Chung et al. | |
| 2017/0199420 A1 | 7/2017 | Shin et al. | |
| 2017/0248789 A1 | 8/2017 | Yokoyama | |
| 2018/0052320 A1 | 2/2018 | Curtis et al. | |
| 2018/0107011 A1* | 4/2018 | Lu | G09G 3/003 |
| 2018/0259691 A1 | 9/2018 | Wang et al. | |
| 2018/0321500 A1* | 11/2018 | Chen | G02B 5/1819 |
| 2019/0121291 A1 | 4/2019 | Leister et al. | |
| 2019/0184694 A1* | 6/2019 | Yashiro | B29C 51/428 |
| 2019/0333444 A1 | 10/2019 | He et al. | |
| 2020/0271836 A1* | 8/2020 | Park | G02B 27/0172 |
| 2021/0341877 A1* | 11/2021 | Funayama | G03H 1/0256 |
| 2023/0178569 A1* | 6/2023 | Shima | H01L 27/1225 257/43 |
| 2023/0204832 A1* | 6/2023 | Suzuki | G02B 5/20 |

FOREIGN PATENT DOCUMENTS

| | | |
|---|---|---|
| JP | H08-211821 A | 8/1996 |
| JP | H10-115800 A | 5/1998 |
| JP | H10-239634 A | 9/1998 |
| JP | 2000-069505 A | 3/2000 |
| JP | 2003-316241 A | 11/2003 |
| JP | 2007-25601 A | 2/2007 |
| JP | 2008-183757 A | 8/2008 |
| JP | 2008-233469 A | 10/2008 |
| JP | 2010-32818 A | 2/2010 |
| JP | 2013-041277 A | 2/2013 |
| JP | 2013-086388 A | 5/2013 |
| JP | 2015-4725 A | 1/2015 |
| JP | 2017-156388 A | 9/2017 |
| JP | 2017-219824 A | 12/2017 |
| JP | 2019-502941 A | 1/2019 |
| JP | 2019-522231 A | 8/2019 |
| WO | WO 2019/017290 A1 | 1/2019 |
| WO | WO 2019/171342 A1 | 9/2019 |

OTHER PUBLICATIONS

Partial Supplementary European Search Report issued Jan. 26, 2024 in European Patent Application No. 21858352.4, 13 pages.
Japanese Office Action issued on Jul. 23, 2024 in Japanese Patent Application No. 2020-163317 (with unedited computer-generated English translation), 10 pages.
Japanese Office Action issued Nov. 12, 2024 in Japanese Patent Application No. 2020-139079 with English translation, 8 pgs.
Extended European Search Report issued May 6, 2024 in European Patent Application No. 21858352.4.

* cited by examiner

DIFFRACTION SHEET AND METHOD FOR MANUFACTURING THE SAME, THREE-DIMENSIONAL DISPLAY DEVICE, LIGHT BEAM REPRODUCTION DEVICE, THREE-DIMENSIONAL SPATIAL DISPLAY SYSTEM, LIGHT BEAM REPRODUCTION METHOD, AND PROGRAM

CROSS-REFERENCE TO RELATED APPLICATIONS

The present application is a continuation of International Application No. PCT/JP2021/030292, filed Aug. 19, 2021, which is based upon and claims the benefits of priority to Japanese Application No. 2020-139079, filed Aug. 20, 2020, and Japanese Application No. 2020-163317, filed Sep. 29, 2020. The entire contents of all of the above applications are incorporated herein by reference.

BACKGROUND OF THE INVENTION

Field of the Invention

The present invention relates to a diffraction sheet and a method for manufacturing the same. The present invention also refers to a three-dimensional display device having the diffraction sheet, a light beam reproduction device, a three-dimensional spatial display system, a light beam reproduction method, and a program.

Discussion of the Background

Various techniques are known for displaying three-dimensional images (stereoscopic images) by controlling the direction of light using a diffraction phenomenon of light.

PTL 1 describes a configuration in which a light-shielding means such as a liquid crystal panel is overlapped with a diffraction pattern so that moving three-dimensional images are smoothly displayed without image skipping.

PTL 2 and PTL 3 describe a display in which a plurality of diffraction elements such as diffraction gratings and holograms are disposed so that stereoscopic images are displayed in natural colors by combining a light source, diffraction grating cells and color filters.

As described above, three-dimensional images can be moved or displayed in full color by aligning and combining a diffraction pattern in which a plurality of diffraction elements are disposed and an arrayed pattern such as a liquid crystal or a color filter.

PTL 1: JP H07-287192 A
PTL 2: JP H08-211821 A
PTL 3: JP 2017-219824 A
PTL 4: JP 2003-316241 A

SUMMARY OF THE INVENTION

According to an aspect of the present invention, a three-dimensional display device includes a diffraction sheet including a transparent substrate, and a diffraction layer having a first diffraction pattern formed in a first array pattern and a second diffraction pattern formed in a second array pattern on the transparent substrate, the diffraction sheet measuring 10 inches or more in diagonal; one of a liquid crystal device having a plurality of pixels and a color filter having a plurality of types of color filters; and a light source. The first diffraction pattern and the second diffraction pattern are overlapped with the pixels or the color filters in a direction normal to the diffraction sheet with an amount of displacement being ¹/₁₀ or less of a pitch of the pixels or the color filters.

According to another aspect of the present invention, a method for manufacturing a diffraction sheet includes forming a first uncured resin layer on a transparent substrate measuring 10 inches or more in diagonal; bringing a first diffraction pattern formed on a first surface of a first plate into contact with the first uncured resin layer, the first diffraction pattern being formed in a rectangular area measuring 10 inches or more in diagonal; placing a first mask having first apertures formed based on a first array pattern on the first plate; irradiating the first mask with light to cure a portion of the first uncured resin layer that overlaps the first apertures; forming a second uncured resin layer on a surface of the substrate on which the first uncured resin layer is formed; bringing a second diffraction pattern, which is different from the first diffraction pattern, formed on a first surface of a second plate into contact with the second uncured resin layer, the second diffraction pattern being formed in a rectangular area measuring 10 inches or more in diagonal; placing a second mask having a plurality of second apertures formed based on a second array pattern different from the first array pattern on the second plate; and irradiating the second mask with light to cure a portion of the second uncured resin layer that overlaps the second apertures.

According to a still another aspect of the present invention, a diffraction sheet includes a transparent substrate; and a diffraction layer having a first diffraction pattern formed in a first array pattern on the substrate and a second array pattern formed in a second diffraction pattern different from the first array pattern on a same side of the substrate as the first diffraction pattern. The second diffraction pattern is thicker than the first diffraction pattern.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
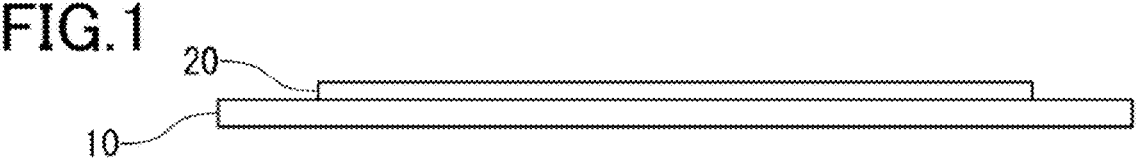
FIG. 1 is a view illustrating a step in a method for manufacturing a diffraction sheet according to a first embodiment of the present invention.

The embodiments will now be described with reference to the accompanying drawings, wherein like reference numerals designate corresponding or identical elements throughout the various drawings.

<Diffraction Sheet>

With reference to FIGS. 1 to 14, a diffraction sheet according to a first embodiment of the present invention will be described.

First, a method for producing a diffraction sheet 1 according to the present embodiment will be described.

In step A, as shown in FIG. 1, a photocuring resin is applied in a layer to a transparent substrate 10 to form an uncured resin layer (first uncured resin layer) 20. As the substrate 10, glass or various resins can be used. A typical example of the photocuring resin is a UV-curing resin, but other materials may be used.

Figure 2:
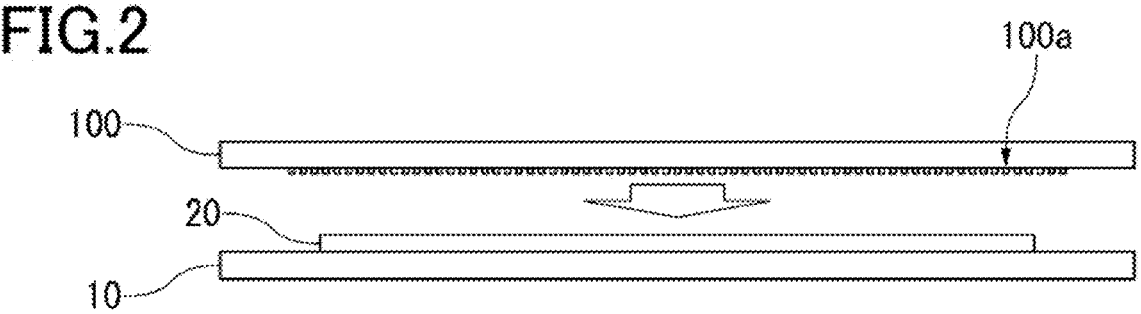
FIG. 2 is a view illustrating another step in the same manufacturing method.

In step B, as shown in FIG. 2, a first plate 100 is brought close to the uncured resin layer 20 and a first diffraction pattern 100*a* formed on the first plate 100 is brought into contact with the uncured resin layer 20.

The first plate 100 is a large-area transparent plate measuring larger than 10 inches in diagonal, and can be produced using the technique described in PTL 4. For example, unit masters each measuring 10 inches in diagonal can be arranged or transferred in a 3×3 two-dimensional matrix to produce a first plate 100 measuring approximately 30 inches in diagonal. The first diffraction pattern 100*a* is formed in a rectangular area measuring 10 inches or more in diagonal on a first surface of the first plate 100. The area where the first diffraction pattern 100*a* is formed has substantially the same dimensions as those of the diffraction sheet to be produced. The first diffraction pattern 100*a* has a surface shape corresponding to a desired diffraction pattern. The first diffraction pattern 100*a* has a surface with a concavo-convex shape, and may have, for example, a plurality of protrusions protruding from a substrate of the first plate 100.

Figure 3:
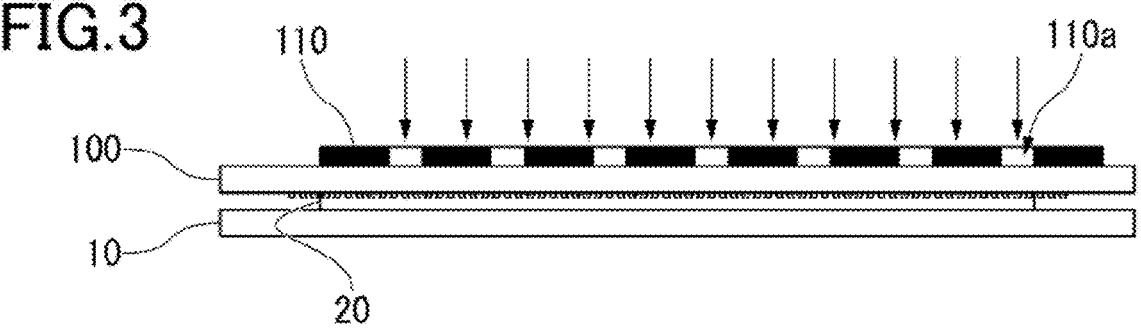
FIG. 3 is a view illustrating another step in the same manufacturing method.

In the subsequent step C, as shown in FIG. 3, a first mask 110 is disposed on the first plate 100, which is then irradiated with light so that the uncured resin layer 20 is cured.

The first mask 110 has a plurality of apertures (first apertures) 110*a* which are formed based on a first array pattern. The first array pattern may be, for example, an array of red filters of RGB color filters. The first mask 110 is substantially the same as a mask for forming a color filter, and a large-area mask can also be produced relatively easily by a known method.

According to step C, only a portion of the uncured resin layer 20 that overlaps the apertures 110*a* in plan view and is exposed through the apertures 110*a* is cured. Hereinafter, the uncured resin layer that is partially cured is also simply referred to as a "resin layer."

Figure 4:
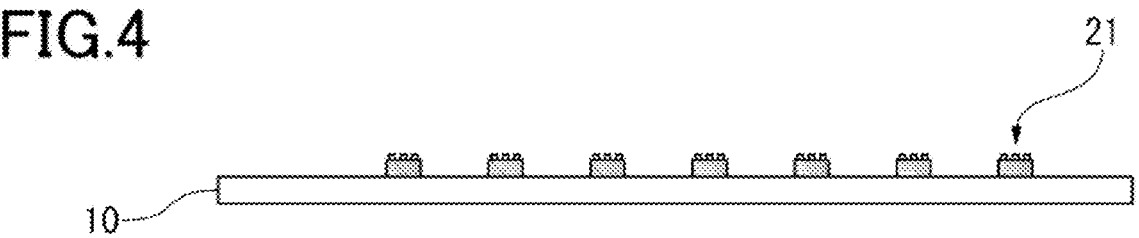
FIG. 4 is a view illustrating another step in the same manufacturing method.

After the first plate 100 and the first mask 110 are removed, the uncured resin of the layer 20 is removed by washing or the like. Thus, as shown in FIG. 4, a first diffraction pattern 21 that is patterned in the first array pattern is formed on the substrate 10. The first diffraction pattern 21 is formed of the cured resin in the same pattern as that of the apertures 110*a* in plan view. Further, protrusions (surface concavities and convexities) according to the first diffraction pattern 100a are formed on an upper surface (a side opposite to that facing the substrate 10) of the first diffraction pattern 21. In the first diffraction pattern 21, the portions in contact with the substrate 10 and the protrusions formed on the upper surface may be integrally formed of the same type of resin.

In addition, the apertures described herein refer to portions that transmit light. Accordingly, the mask does not require holes (spaces).

Figure 5:
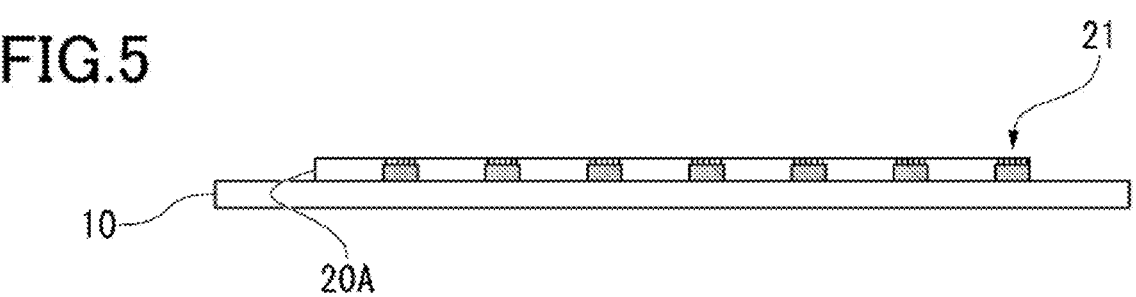
FIG. 5 is a view illustrating another step in the same manufacturing method.

In the subsequent step D, as shown in FIG. 5, a photocuring resin is applied to a surface of the substrate 10 on which the first diffraction pattern 21 is formed to form an uncured resin layer (second uncured resin layer) 20A. The photocuring resin forming the uncured resin layer 20A may be the same as or different from the resin used in step A. The uncured resin layer 20A may cover a part or the entirety of the first diffraction pattern 21.

Figure 6:
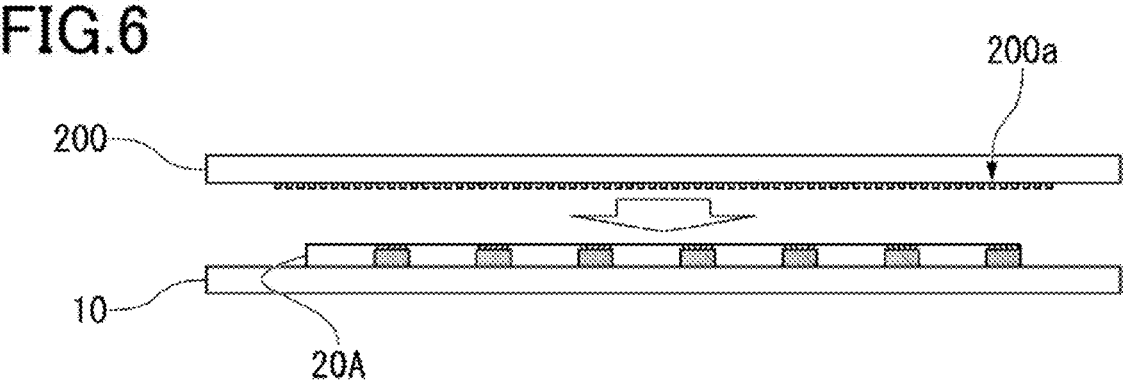
FIG. 6 is a view illustrating another step in the same manufacturing method.

In the subsequent step E, as shown in FIG. 6, a second plate 200 is brought close to the uncured resin layer 20A and a second diffraction pattern 200a formed on the second plate 200 is brought into contact with the uncured resin layer 20A.

The second plate 200 is a transparent plate having the same size as that of the first plate 100. The second diffraction pattern 200a is a diffraction pattern different from the first diffraction pattern 100a, and formed in a rectangular area measuring 10 inches or more in diagonal on a first surface of the second plate 200.

Figure 7:
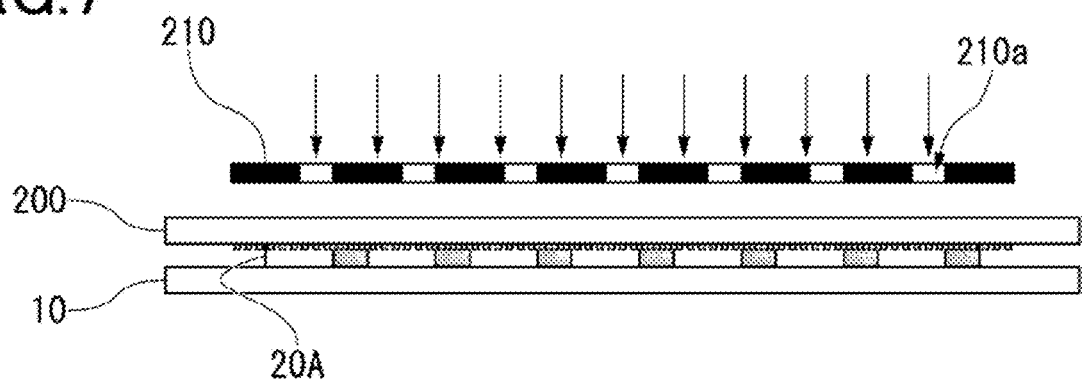
FIG. 7 is a view illustrating another step in the same manufacturing method.

In the subsequent step F, as shown in FIG. 7, a second mask 210 is disposed on the second plate 200, which is then irradiated with light so that the uncured resin layer 20A is cured.

The second mask 210 has a plurality of apertures (second apertures) 210a which are formed based on a second array pattern different from the first array pattern. The second array pattern may be, for example, an array of green filters of RGB color filters.

Figure 8:
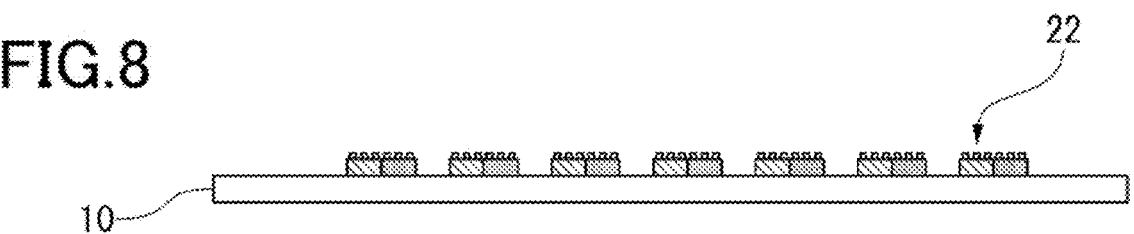
FIG. 8 is a view illustrating another step in the same manufacturing method.

According to step F, only a portion of the uncured resin layer 20A that overlaps the apertures 210a in plan view and is exposed through the apertures 210a is cured. After the second plate 200 and the second mask 210 are removed, the uncured resin of the layer 20A is removed by washing or the like. Thus, as shown in FIG. 8, a second diffraction pattern 22 that is patterned in the second array pattern is formed on the substrate 10. In this process, the uncured resin that covers a part or the entirety of the first diffraction pattern 21 is also removed. The second diffraction pattern 22 is formed of the cured resin in the same pattern as that of the apertures 210a in plan view. Further, protrusions according to the second diffraction pattern 200a are formed on an upper surface of the second diffraction pattern 22. In the second diffraction pattern 22, the portions in contact with the substrate 10 and the protrusions formed on the upper surface may be integrally formed of the same type of resin.

Figure 9:
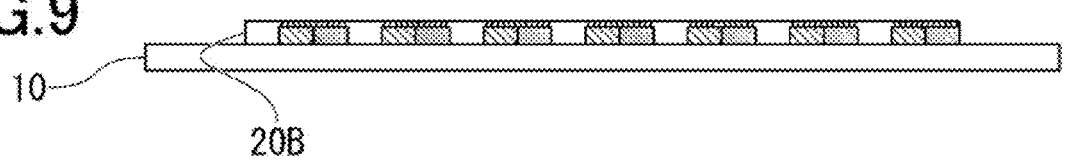
FIG. 9 is a view illustrating another step in the same manufacturing method.

In the subsequent step G, as shown in FIG. 9, a photocuring resin is applied to a surface of the substrate 10 on which the second diffraction pattern 22 is formed to form an uncured resin layer (third uncured resin layer) 20B. The photocuring resin forming the uncured resin layer 20B may be the same as or different from any of the resins used in steps A and D. The uncured resin layer 20B may cover a part or the entirety of the first diffraction pattern 21 and the second diffraction pattern 22.

Figure 10:
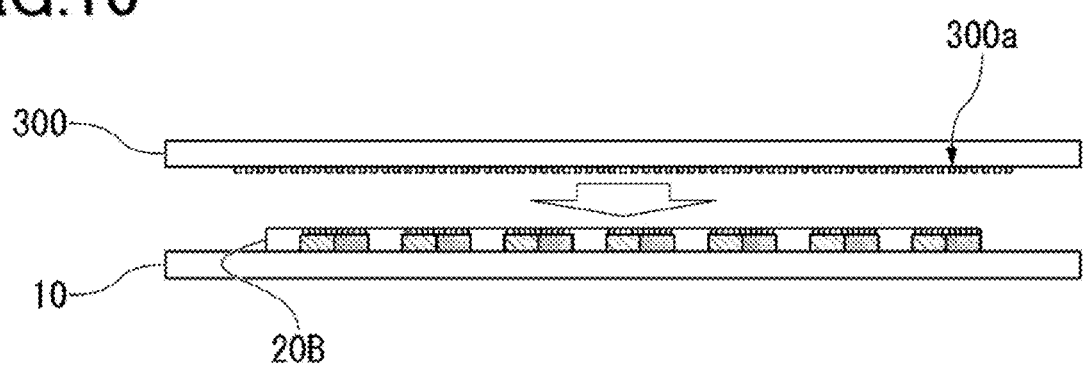
FIG. 10 is a view illustrating another step in the same manufacturing method.

In the subsequent step H, as shown in FIG. 10, a third plate 300 is brought close to the uncured resin layer 20B and a third diffraction pattern 300a formed on the third plate 300 is brought into contact with the uncured resin layer 20B.

The third plate 300 is a transparent plate having the same size as that of the first plate 100 and the second plate 200. The third diffraction pattern 300a is a diffraction pattern different from both the first diffraction pattern 100a and the second diffraction pattern 200a, and formed in a rectangular area measuring 10 inches or more in diagonal on a first surface of the third plate 300.

Figure 11:
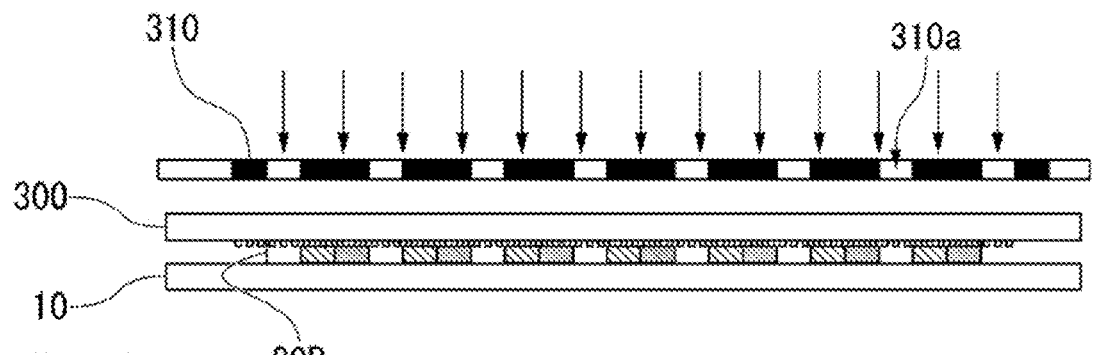
FIG. 11 is a view illustrating another step in the same manufacturing method.

In the subsequent step I, as shown in FIG. 11, a third mask 310 is disposed on the third plate 300, which is then irradiated with light so that the uncured resin layer 20B is cured.

The third mask 310 has a plurality of apertures (third apertures) 310a which are formed based on a third array pattern different from both the first array pattern and the second array pattern. The third array pattern may be, for example, an array of blue filters of RGB color filters.

Figure 12:
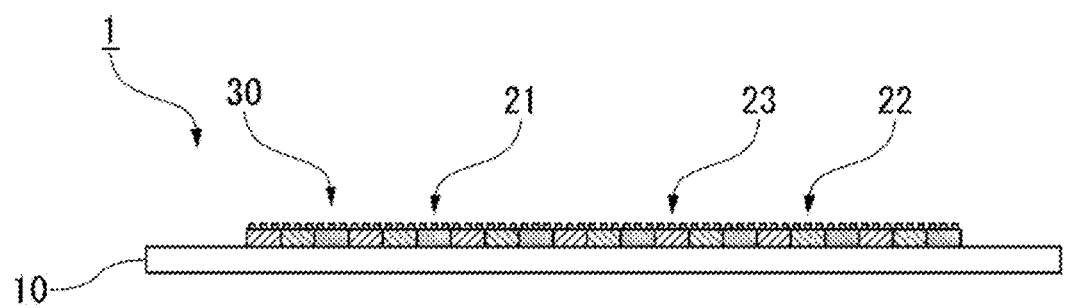
FIG. 12 is a view illustrating a completed diffraction sheet.

According to step I, only a portion of the uncured resin layer 20B that overlaps the apertures 310a in plan view and is exposed through the apertures 310a is cured. After the third plate 300 and the third mask 310 are removed, the uncured resin of the layer 20B is removed by washing or the like. Thus, as shown in FIG. 12, a third diffraction pattern 23 that is patterned in the third array pattern is formed on the substrate 10. The third diffraction pattern 23 is formed of the cured resin in the same pattern as that of the apertures 310a in plan view. Further, protrusions according to the third diffraction pattern 300a are formed on an upper surface of the third diffraction pattern 23. In the third diffraction pattern 23, the portions in contact with the substrate 10 and the protrusions formed on the upper surface may be integrally formed of the same type of resin.

Thorough the above steps, the diffraction sheet 1 of the present embodiment is manufactured. As shown in FIG. 12, the diffraction sheet 1 includes, on the substrate 10, the diffraction layer 30 including the first diffraction pattern 21, the second diffraction pattern 22 and the third diffraction pattern 23.

The first diffraction pattern 21, the second diffraction pattern 22 and the third diffraction pattern 23 are accurately arranged according to the first array pattern, the second array pattern and the third array pattern, respectively, in plan view of the diffraction sheet 1. Therefore, when aligned and mounted on a color filter in which three-color filters are arranged according to the first array pattern, the second array pattern and the third array pattern, or on a liquid crystal device, having a liquid crystal layer and a drive substrate, in which pixels with the same size as the apertures 110a, the apertures 210a and the apertures 310a are arranged, the diffraction patterns 21, 22 and 23 can be overlapped with the color filters or the pixels in a direction normal to the diffraction sheet 1 while suppressing the amount of displacement to 1/10 or less of the pitch of the color filters or the pixels.

According to the method for manufacturing a diffraction sheet of the present embodiment, entire diffraction patterns that are not patterned are used as the plates (first plate 100, second plate 200 and third plate 300) in steps B, E and H, and irradiated with light via the masks (first mask 110, second mask 210 and third mask 310) in steps C, F and I, whereby uncured resin layers 20, 20A and 20B are patterned and cured, respectively. Further, since a resin is partially cured in a state in which each plate is in contact with the uncured resin layer, a plurality of diffraction patterns 21, 22 and 23 can be obtained in which the concavo-convex shapes of the diffraction patterns 100a, 200a and 300a formed on the surfaces of the plates (first plate 100, second plate 200 and third plate 300) are respectively transferred to the upper surface.

Accordingly, it is possible to produce a diffraction layer 30 including a plurality of diffraction patterns while achieving high patterning accuracy even in a large area of 10 inches or more in diagonal.

In the above example described in the present embodiment, three sets of diffraction patterns are formed using the plates and masks, but this is merely an example. The number of times diffraction patterns are formed can be a desired number of 2 or more. That is, the diffraction sheet 1 may include only two types of diffraction patterns 21 and 22. The diffraction sheet 1 may be overlapped with either a liquid crystal device having a plurality of pixels or a color filter having two or more types of color filters. When the first diffraction pattern 21 and the second diffraction pattern 22 overlap the pixels or the color filters in a direction normal to the diffraction sheet 1, the amount of displacement can be suppressed to $1/10$ or less of the pitch of the color filters or the pixels.

Accordingly, a moving three-dimensional image can be displayed, for example, by forming a plurality of patterns capable of reproducing three-dimensional images slightly different from each other, and mounting them on a liquid crystal device to configure a display device.

Figure 13:
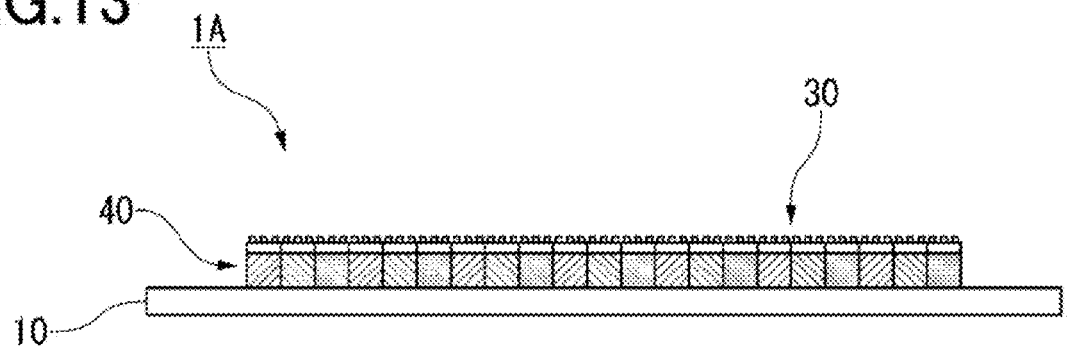
FIG. 13 is a view illustrating a modified example of the diffraction sheet.

A diffraction sheet 1A of a modified example shown in FIG. 13 includes a color filter 40 having a plurality of types of color filters disposed between the substrate 10 and the diffraction layer 30. The diffraction sheet 1A is manufactured by forming a color filter 40 having a plurality of color filters on the substrate 10 using the first mask 110, the second mask 210 and the third mask 310, and then forming a diffraction layer 30 on the color filter 40.

In manufacturing of the diffraction sheet 1A, since the masks used for forming color filters of the color filter 40 can also be used as the first mask 110, the second mask 210 and the third mask 310, respectively, the diffraction sheet 1A can be readily manufactured while suppressing the amount of displacement between the diffraction patterns and corresponding color filters to $1/10$ or less of the pitch of the color filters.

Figure 14:
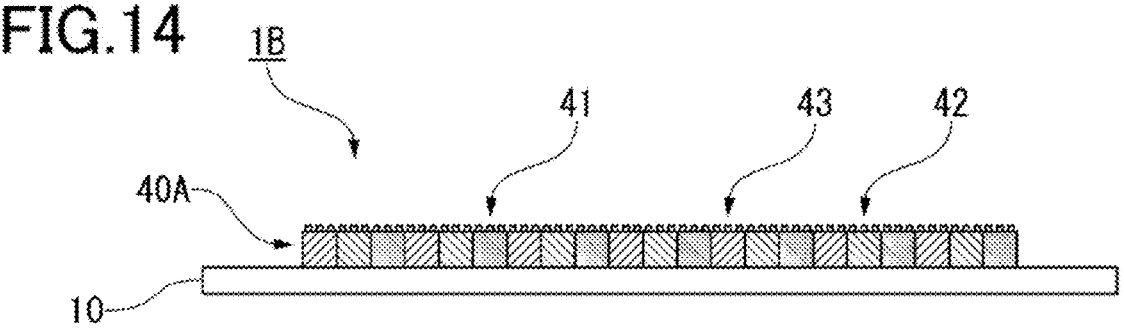
FIG. 14 is a view illustrating a modified example of the diffraction sheet.

A diffraction sheet 1B of the modified example shown in FIG. 14 includes a diffraction layer 40A instead of the diffraction layer 30. The diffraction layer 40A includes a first diffraction pattern 41 containing a red color material, a second diffraction pattern 42 containing a green color material, and a third diffraction pattern 43 containing a blue color material. That is, the diffraction layer 40A also functions as a color filter.

The diffraction sheet 1B can be produced in the same manner as described above simply by mixing the material of the uncured resin layer with corresponding color materials. The diffraction sheet 1B has an advantage that no displacement occurs between the color filter and the diffraction pattern.

As described above, a method for manufacturing diffraction sheets 1, 1A and 1B of the present embodiment includes: a step A of forming a first uncured resin layer 20 on a transparent substrate 10 measuring 10 inches or more in diagonal; a step B of bringing a first diffraction pattern 100a formed on a first surface of a first plate 100 into contact with the first uncured resin layer 20, the first diffraction pattern 100a being formed in a rectangular area measuring 10 inches or more in diagonal; a step C of placing a first mask 110 having a plurality of first apertures 110a formed based on a first array pattern on the first plate 100, which is then irradiated with light to cure a portion of the first uncured resin layer 20 that overlaps the first apertures 110a; a step D of forming a second uncured resin layer 20A on a surface of the substrate 10 on which the first uncured resin layer 20 is formed; a step E of bringing a second diffraction pattern 200a, which is different from the first diffraction pattern 100a, formed on a first surface of a second plate 200 into contact with the second uncured resin layer 20A, the second diffraction pattern 200a being formed in a rectangular area measuring 10 inches or more in diagonal; and a step F of placing a second mask 210 having a plurality of second apertures 210a formed based on a second array pattern different from the first array pattern on the second plate 200, which is then irradiated with light to cure a portion of the second uncured resin layer 20A that overlaps the second apertures 210a.

Accordingly, it is possible to produce diffraction layers 30 and 40A including a plurality of diffraction patterns while achieving high patterning accuracy even in a large area of 10 inches or more in diagonal.

Further, the diffraction sheet 1A of the present embodiment includes: a transparent substrate 10; a diffraction layer 30 having a first diffraction pattern 21 arranged in a first array pattern on the substrate 10 and a second diffraction pattern 22 arranged in a second array pattern different from the first array pattern on the same side of the substrate 10 as that having the first diffraction pattern 21; and a color filter 40 including a plurality of color filters, the color filter 40 being disposed between the first and second diffraction patterns 21 and 22 and the substrate 10, wherein the amount of displacement of the first and second diffraction patterns 21 and 22 relative to the color filters in plan view may be $1/10$ or less of the pitch of the color filters.

With this configuration, the amount of displacement of the diffraction patterns 21 and 22 relative to the corresponding color filters can be suppressed. Since the masks used for forming the respective color filters of the color filter 40 can also be used as the masks for forming the diffraction patterns 21 and 22, the diffraction sheet can be readily manufactured.

Further, a first diffraction pattern 41 and a second diffraction pattern 42 may contain color materials, and the diffraction layer 40A may function as a color filter. With this configuration, there is an advantage that no displacement occurs between the color filter and the diffraction patterns.

Further, the diffraction sheets 1, 1A and 1B may have a rectangular shape in plan view measuring 10 inches or more in diagonal. In the present embodiment, as described above, it is possible to achieve high patterning accuracy even in a large area of 10 inches or more in diagonal in the diffraction layers 30 and 40A including a plurality of diffraction patterns.

Figure 15:
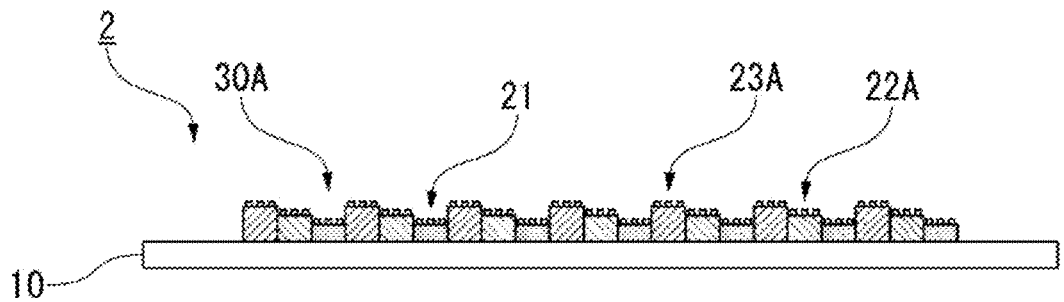
FIG. 15 is a schematic view of a diffraction sheet according to a second embodiment of the present invention.
Figure 16:
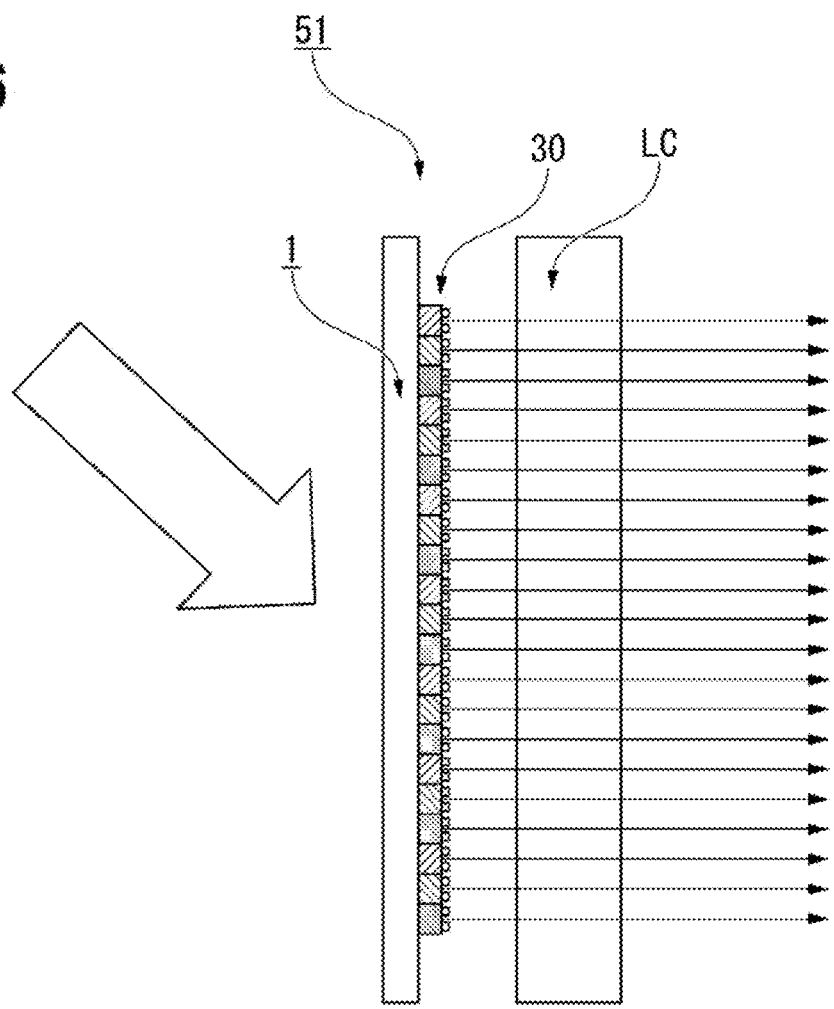
FIG. 16 is a schematic view of a three-dimensional display device according to the present invention.
Figure 17:
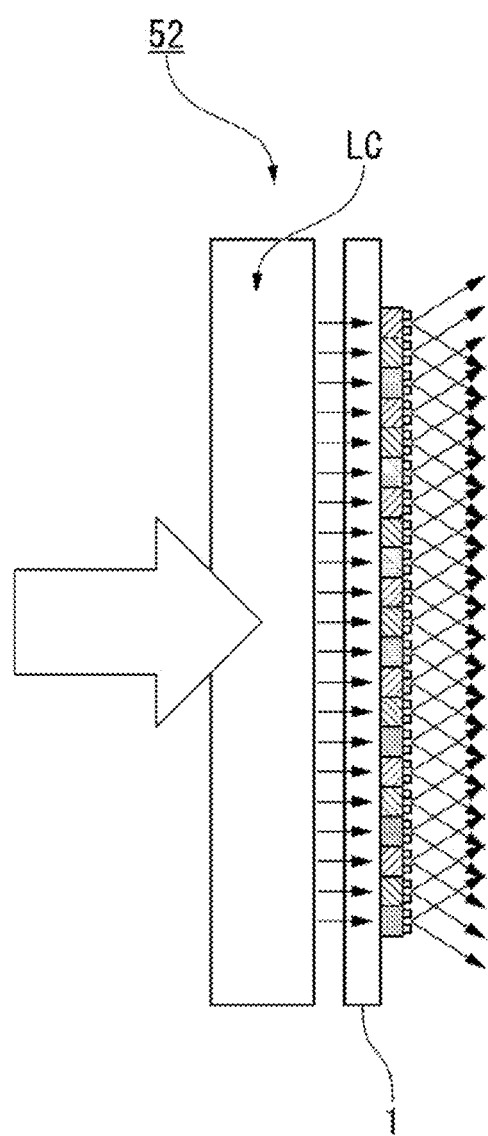
FIG. 17 is a schematic view of another example of a three-dimensional display device according to the present invention.

With reference to FIGS. 15 to 17, a diffraction sheet of a second embodiment of the present invention will be described. In the following description, components that are common to those described above are denoted by the same reference signs, and duplicated description thereof will be omitted.

FIG. 15 is a schematic view of a diffraction sheet 2 according to the present embodiment. The diffraction sheet 2 includes a diffraction layer 30A instead of the diffraction layer 30.

Of three diffraction patterns constituting the diffraction layer 30A, the first diffraction pattern 21 is the same as in the first embodiment. A second diffraction pattern 22A has the same pattern as that of the second diffraction pattern 22, but is thicker than the second diffraction pattern 22. A third diffraction pattern 23A has the same pattern as that of the third diffraction pattern 23, and is further thicker than the second diffraction pattern 22A.

The diffraction sheet 2 can be manufactured in substantially the same manner as in the first embodiment. Modifications from the first embodiment are as follows.

In step E, the uncured resin layer 20A is formed to be thicker than the uncured resin layer 20.

In step F, the second plate 200 is held at a position higher than the first plate 100.

In step G, the uncured resin layer 20B is formed to be thicker than the uncured resin layer 20A.

In step H, the third plate 300 is held at a position higher than the second plate 200.

The number of times diffraction patterns are formed may be a desired number of 2 or more. Also, when the number of types of diffraction patterns in the diffraction layer 30A increases, a newly formed uncured resin layer may be formed thicker than the last formed uncured resin layer.

The diffraction sheet 2 and the method for manufacturing the same according to the present embodiment have the same effects as those of the first embodiment.

Further, due to the diffraction pattern formed later being thicker, the plate brought into contact with the uncured resin layer is less likely to come into contact with the diffraction pattern already formed. As a result, the diffraction pattern already formed can be suitably prevented from deforming or being damaged.

In the present embodiment, a step difference h between diffraction patterns (difference in height between different types of diffraction patterns) can be appropriately set, and may be, for example, 100 nm or more and 10 µm or less. In the example shown in FIG. 15, the step difference h between diffraction patterns refers to the difference in height between the first diffraction pattern 21 and the second diffraction pattern 22A, the difference in height between the second diffraction pattern 22A and the third diffraction pattern 23A, and the difference in height between the first diffraction pattern 21 and the third diffraction pattern 23A.

A too large step difference may increase leakage light, which is stray light caused by light incident on adjacent color filters or pixels.

When the average pitch of the diffraction pattern is d, the wavelength of light is λ, and the diffraction angle is θ, the following formula 1 holds:

$$\sin(\theta) = \lambda/d \quad (1)$$

The width w of leakage light in plan view of the diffraction sheet 2 can be calculated by the following formula 2. By suppressing the value of w to 1/10 or less of the pitch of the color filters or the pixels, the influence of stray light can be reduced to an insignificant level.

$$w = h \times \tan(\theta) \quad (2)$$

From another point of view, the step difference h is preferably larger than or equal to a height difference between surface concavities and convexities to be formed on the upper surface of the diffraction pattern formed later. Further, the step difference h is more preferably 1.5 times or more the height difference between surface concavities and convexities. That is, the step difference h is preferably larger than or equal to a protruding height of the diffraction patterns 100a, 200a and 300a, and more preferably 1.5 times or more the protruding height of the diffraction patterns 100a, 200a and 300a. With this configuration, when the plate is brought into contact with the uncured resin layer which is formed thicker, the plate is less likely to come into contact with the diffraction pattern already formed. Accordingly, it is possible to suitably retain the diffraction pattern already formed.

As described above, according to the method for manufacturing a diffraction sheet 2 of the present embodiment, the second uncured resin layer 20A is formed thicker than the first uncured resin layer 20 in step D.

Further, the difference in thickness between the second uncured resin layer 20A and the first uncured resin layer 20 may be larger than or equal to the height of the second diffraction pattern 200a.

The diffraction sheet 2 of the present embodiment includes: a transparent substrate 10; and a diffraction layer 30A having a first diffraction pattern 21 arranged in a first array pattern on the substrate 10 and a second diffraction pattern 22A arranged in a second array pattern different from the first array pattern on the same side of the substrate 10 as that having the first diffraction pattern 21, wherein the second diffraction pattern 22A is thicker than the first diffraction pattern 21.

With this configuration, the diffraction pattern 21 can be suitably prevented from deforming or being damaged in manufacturing of the diffraction pattern 22A.

Further, the difference in thickness between the second diffraction pattern 22A and the first diffraction pattern 21 may be larger than or equal to the height difference between surface concavities and convexities of the second diffraction pattern 22A. With this configuration, when the plate is brought into contact with the uncured resin layer having greater thickness, the plate is less likely to come into contact with the diffraction pattern already formed. Accordingly, it is possible to suitably retain the diffraction pattern already formed.

Further, the difference in thickness between the second diffraction pattern 22A and the first diffraction pattern 21 may be 100 nm or more and 10 µm or less. With this configuration, the influence of stray light can be reduced to an insignificant level.

<Three-Dimensional Display Device>

The following description will be given of a three-dimensional display device to which the diffraction sheet according to the present invention is applied. FIG. 16 is a schematic view of a three-dimensional display device 51 in which the diffraction sheet 1 is disposed on a light-incident side of the liquid crystal device LC. That is, the diffraction sheet 1 is disposed between the light source and the liquid crystal device LC. Since light emitted from the diffraction layer 30 has an angle closer to perpendicular to the diffraction sheet 1 than light emitted from a light source (not shown) toward the diffraction sheet 1, it is possible to accurately guide the light to the liquid crystal device LC or a color filter mounted on the liquid crystal device LC by appropriately aligning the diffraction patterns of the diffraction sheet 1 with the pixels of the liquid crystal device LC.

FIG. 17 is a schematic view of a three-dimensional display device 52 in which the diffraction sheet 1 is disposed on a light-emitting side of the liquid crystal device LC. That is, the liquid crystal device LC is disposed between the light source and the diffraction sheet 1. Since light incident on the liquid crystal device LC becomes high-directivity light as it passes through the diffraction sheet 1, a display with high contrast and excellent color development can be achieved.

In both cases of the three-dimensional display devices 51 and 52, a distance between the diffraction sheet 1 and the liquid crystal device LC or the color filter is preferably 500 µm or less in order to suppress displacement of light beams therebetween. The diffraction sheet 1 and the liquid crystal device LC or the like may be disposed in close contact with each other (that is, with a distance of zero). In this case, from the perspective of sufficiently exhibiting the diffraction effect, a slight air layer or vacuum layer may be provided between the diffraction pattern and the liquid crystal device LC.

When the diffraction sheet 1 is adhered to the liquid crystal device LC or the like via an adhesive or a pressure-sensitive adhesive, it is required that the refractive index of a resin of the diffraction pattern is different from the refractive index of the adhesive or the pressure-sensitive adhesive.

The diffraction sheet of the three-dimensional display devices 51 and 52 may not necessarily be the diffraction sheet 1, but may be the diffraction sheet 1A, 1B or 2. Further, the three-dimensional display devices 51 and 52 may include a color filter having two or more types of color filters instead of the liquid crystal device LC.

As described above, the three-dimensional display devices 51 and 52 of the present embodiment include: a diffraction sheet 1, 1A, 1B or 2 including a transparent substrate 10, and a diffraction layer 30, 30A or 40A having a first diffraction pattern 21 or 41 arranged in a first array pattern and a second diffraction pattern 22, 22A or 42 arranged in a second array pattern on the substrate 10, the diffraction sheet measuring 10 inches or more in diagonal; one of a liquid crystal device LC having a plurality of pixels and a color filter having two or more types of color filters; and a light source, wherein the first diffraction pattern 21 or 41 and the second diffraction pattern 22, 22A or 42 are overlapped with the pixels or the color filters in a direction normal to the diffraction sheet 1, 1A, 1B or 2 while suppressing the amount of displacement to 1/10 or less of a pitch of the pixels or the color filters.

With this configuration, a large-area three-dimensional display device that displays a moving three-dimensional image or a color three-dimensional image can perform excellent display.

The diffraction sheet 1, 1A, 1B or 2 may be disposed between the light source and the liquid crystal device LC or the color filter. With this configuration, it is possible to accurately guide the light to the liquid crystal device LC or the color filter by appropriately aligning the diffraction patterns of the diffraction sheet 1, 1A, 1B or 2 with the pixels of the liquid crystal device LC or the respective color filters of the color filter.

Alternatively, the liquid crystal device LC or the color filter may be disposed between the light source and the diffraction sheet 1, 1A, 1B or 2. Since light incident on the liquid crystal device LC becomes high-directivity light as it passes through the diffraction sheet 1, 1A, 1B or 2, a display with high contrast and excellent color development can be achieved.

Although some embodiments of the present invention have been described in detail with reference to the drawings, specific configurations are not limited to these embodiments. Various modifications and combinations of the configurations can be made without departing from the spirit of the present invention. Some modifications will be described below, but these are not exhaustive and other modifications are also possible. Two or more of these modifications may be appropriately combined.

The step difference between diffraction patterns may be omitted by appropriately setting an elastic modulus of the diffraction pattern. In this case, it is possible to prevent the formed diffraction pattern from being damaged by the plate or prevent transfer failure from occurring in a newly formed diffraction pattern due to uneven pressure. From this perspective, the elastic modulus (hardness) of the formed (that is, cured) diffraction pattern is preferably 0.5 MPa to 100 GPa at room temperature, and more preferably 2500 MPa to 13 GPa.

In the method for manufacturing a diffraction sheet, a release layer may be provided on a surface of the diffraction patterns 100a, 200a and 300a of the plates 100, 200 and 300 to be used, respectively. With this configuration, the plate can be easily removed after the uncured resin layer is cured in steps C, F, I, and the like, so that a diffraction pattern can be suitably formed.

Examples of the material for the release layer include materials for improving slippage, such as silicone, fluorine-based resins, and polymers having alkyl groups, as well as thermosetting resins that become brittle when heated.

In the latter case, the plate is heated to cure the release layer after the uncured resin layer is cured by light irradiation. Then, when the plate is removed, the plate is easily separated from the diffraction pattern as the brittle release layer is separated from the plate and remains on the diffraction pattern. The separated release layer is then removed from the diffraction pattern by washing or the like. After production of the diffraction sheet, a new release layer is placed on the plate for the next production. The thickness of the release layer configured to be separated from the plate by heating may be, for example, 10 nm or more and 1 µm or less.

The surface of the diffraction layer may be flattened by disposing a transparent material having a refractive index different from that of the resin constituting the diffraction pattern on the diffraction pattern. Furthermore, the diffraction layers 30, 30A and 40A may be directly bonded to the liquid crystal device LC, the color filter, or the like by using a pressure-sensitive adhesive resin material (pressure-sensitive adhesive material) as the transparent material.

In addition, a gas layer such as air or a vacuum layer may be disposed on the diffraction layers 30, 30A and 40A. The diffraction pattern adjacent to a gas layer such as air or a vacuum layer can suitably diffract incident light.

The uncured resin layer may be made of a thermosetting resin. In this case, each diffraction pattern can be formed by heating only the region corresponding to the array pattern. Since the plate may not necessarily be transparent, it may be formed of a metal such as nickel to enhance durability.

In the diffraction sheets 1, 1A, 1B and 2 according to the above embodiments of the present invention, the plurality of diffraction patterns may be arranged without a gap therebetween or with a gap of a predetermined width. If the gap has a width not greater than the width in plan view of a partition wall in the liquid crystal pixel or a black matrix formed in the color filter, the influence on the display quality can be minimized. In light of typical dimensions of the partition walls or black matrices, the width of the gap is preferably 1 µm or more and 100 µm or less, and more preferably 5 µm or more and 40 µm or less.

<Three-Dimensional Spatial Display System>

In conventional three-dimensional display devices capable of displaying moving three-dimensional images or color three-dimensional images, there is a problem that large blurring may occur due to the effect of diffraction when displaying a space with a depth that allows for an appropriate interpersonal distance (personal space). The present inventors have diligently conducted studies on three-dimensional display devices that can mainly display spaces (social distance spaces) with a depth from about 1.2 m to about 3.6 m from the display surface or a space with a depth larger than that as three-dimensional spaces with a natural sense of distance and less blur by using, for example, the diffraction sheets 1, 1A, 1B or 2 described above. The details are as follows.

In communication between family members, close friends, or in the field of politics and business, knowing each other's feelings is important. As the non-verbal part of communication, it is necessary to convey pauses in conversation or a sense of distance of the personal space without a sense of discomfort, and in addition, it is important to acquire non-verbal information such as facial expressions and gestures of people in that sense of distance.

Various techniques have been provided for smooth communication. For example, in the field of communication technologies, 5G low latency is used to reduce communication latency and realize online conversations with the same pauses as in real conversations. Further, three-dimensional measurement technologies such as TOF (Time of Flight) are used to accurately measure the distance to a person. However, there is no known technique for displaying a space with a depth that allows for an appropriate interpersonal distance (personal space) without a sense of discomfort.

The space with a depth described herein refers to a space larger than a space that allows for an interpersonal distance from about 1.2 m to about 3.6 m that is mainly applied to the cases where a person communicates publicly with others. In the following description, the space with a depth that allows for an interpersonal distance from about 1.2 m to about 3.6 m is referred to as a "social distance space."

There are various techniques for displaying three-dimensional images with depth. For example, there are wearable display devices such as head-up displays, polarization glasses and liquid crystal shutter glasses, and techniques for displaying stereoscopic images, such as parallax barriers and lenticular displays, which are not wearable type, by making two eyes observe different parallaxes. These techniques for displaying three-dimensional images impart a three-dimensional effect only by parallax. Since these techniques require convergence by which the line of sight is concentrated on one point and focus adjustment, users may feel eye strain and motion sickness. Therefore, these techniques may not be suitable as tools for displaying a social distance space with depth.

On the other hand, NPL 1 discloses a technique for displaying three-dimensional images without requiring convergence and focus adjustment.

NPL 1: [online], "Research trend in light field display" March 2018, Takafumi Koike, [searched on Aug. 3, 2020], Internet <URL: home.jeita.or.jp/device/lirec/symposium/fpd/pdf/2018_2a.pdf>

Figure 36:
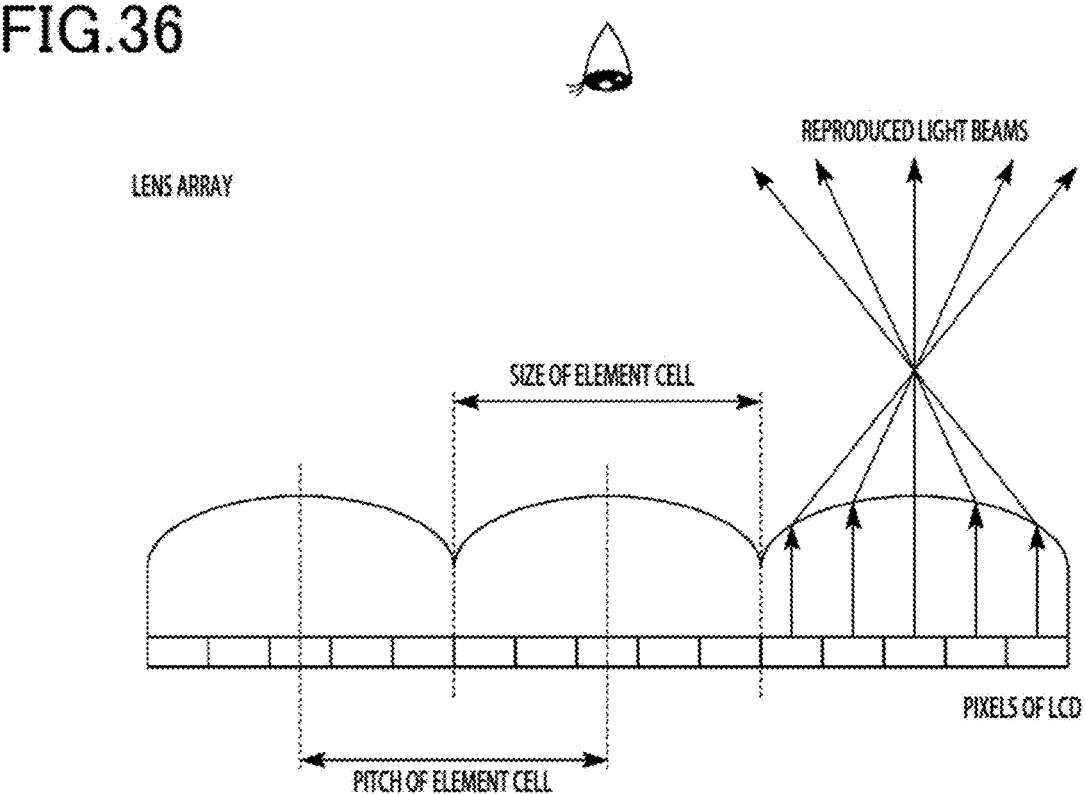
FIG. 36 is a schematic cross-sectional view illustrating a configuration of a conventional light field display using a microlens array.
Figure 37:
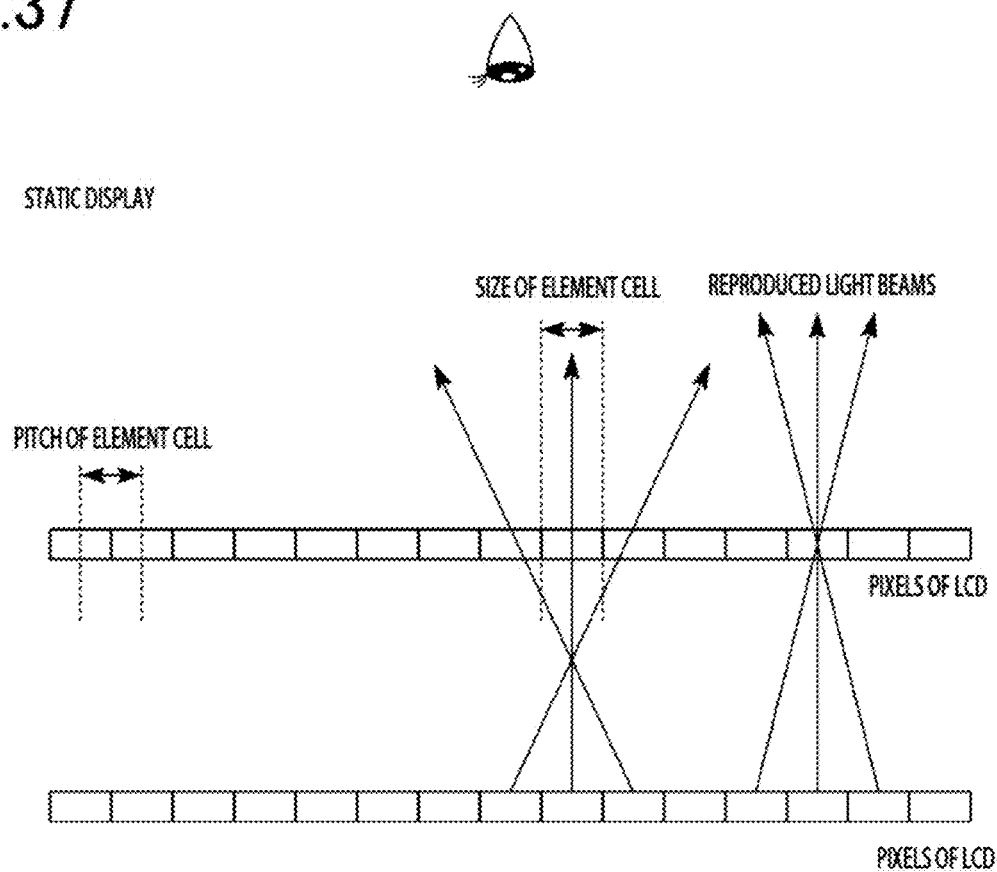
FIG. 37 is a schematic cross-sectional view illustrating a configuration of a conventional static display type light field display in which liquid crystal panels are stacked.

NPL 1 discloses a display that records a light field (direction information and intensity distribution, on an imaging surface of a digital camera, of a light beam incident on the imaging surface) using a super multi-view display or a microlens array, and reproduces (displays) the recorded light field (see FIG. 36). Furthermore, a static display-type light field display (see FIG. 37) in which liquid crystal panels and the like are stacked is proposed.

In addition, according to a stereoscopic image display device described in PTL 5, a technique for sufficiently increasing the number of viewpoints (super multi-view) is disclosed.

PTL 5: JP 2007-17634 A

The technique of PTL 5 can satisfy four factors, i.e., binocular parallax, focus adjustment, convergence and motion parallax for human stereoscopic perception. In display of three-dimensional images by such a super multi-view display or a light field display, natural focus adjustment and convergence are performed by reproducing light beams in a size smaller than the size of a pupil.

However, in the super multi-view display described in PTL 5 and the like, natural focus adjustment and convergence are performed by reproducing light beams in a size smaller than the size of a pupil. Since light beams are controlled in a very small area, blurring increases due to the effect of diffraction with an increase in the distance from the display surface. As a result, only objects in the vicinity of the display can be reproduced, and when the display surface is located close to the observer, reproduction of a social distance space is difficult. On the other hand, when the display surface is located close to the social distance space and away from the observer, the display needs to be sized larger than the space desired to display, which requires a high cost and a large installation space.

As described above, in reproduction of a social distance space, there is a problem that large blurring occurs in conventional light field displays due to the effect of diffraction.

In order to solve the above problem, the present inventors have conducted studies on light beam reproduction devices, three-dimensional spatial display systems, light beam reproduction methods, and programs that can mainly display spaces (social distance spaces) with a depth from about 1.2 m to about 3.6 m from the display surface or a space with a depth larger than that as three-dimensional spaces with a natural sense of distance and less blur.

Referring now to the drawings, a three-dimensional spatial display system according to some embodiments of the present invention will be described in detail. A three-dimensional spatial display system 1S may be implemented by, for example, an optical device and an electric circuit. Further, the present invention is not limited to the embodiments described below, and can be appropriately combined and modified without departing from the gist of the present invention.

Figure 18:
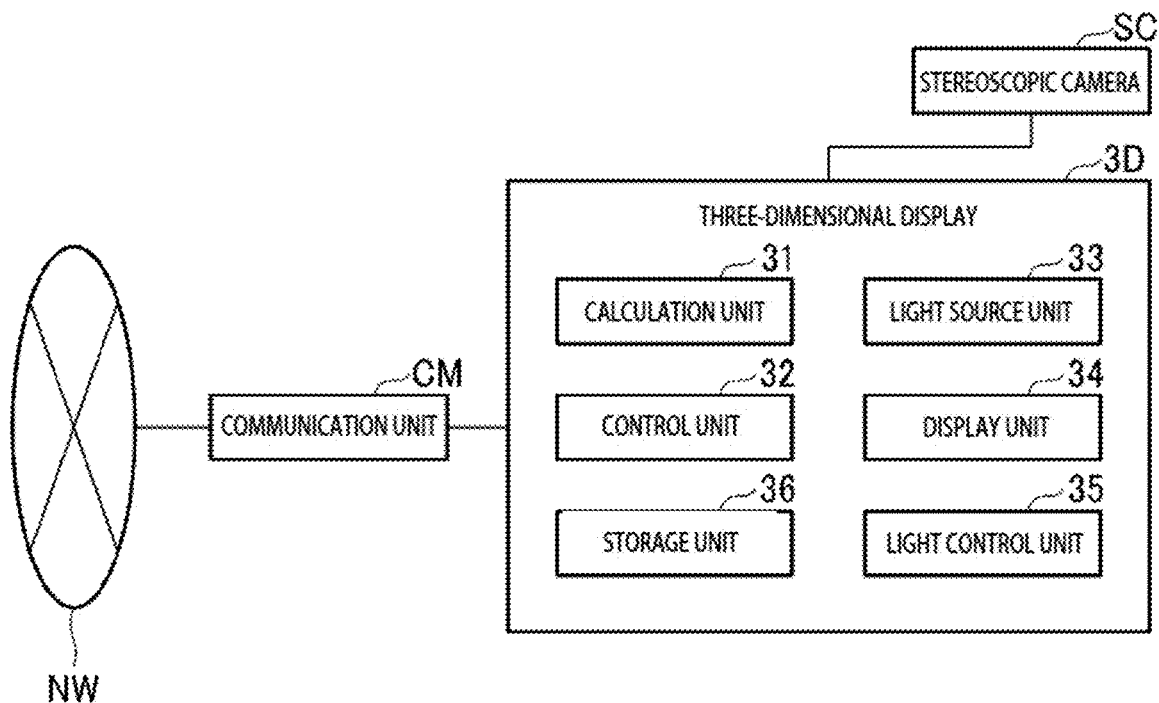
FIG. 18 is a block diagram illustrating a configuration of a three-dimensional spatial display system of a third embodiment.

FIG. 18 is a block diagram illustrating a configuration of the three-dimensional spatial display system 1S of a third embodiment. The three-dimensional spatial display system 1S includes, for example, a communication unit CM, a stereoscopic camera SC, and a three-dimensional display 3D. The communication unit CM externally communicates via a digital communication network NW.

The stereoscopic camera SC is a camera that captures a stereoscopic image of an object to be observed, which is a subject, and may be, for example, a stereo camera. The stereoscopic camera SC transfers the three-dimensional information of the object to be observed to the three-dimensional display 3D via the communication unit CM. The three-dimensional information described herein includes at least the incidence direction and intensity of an incident light beam from the object onto the imaging surface, and may be any information indicating a space including an object to be observed, such as information obtained from two or more parallax image sequences, a combination of a two-dimensional image and a distance image, or the like.

Various methods are possible for acquiring three-dimensional information. For example, when the stereoscopic camera SC is a stereo camera, there is a method for acquiring three-dimensional information by measuring depth information (hereinafter, also referred to as depth distance) using images respectively captured by two cameras. Another method is analyzing a pattern projected onto an object to be imaged. Still another method is a TOF method in which the time of flight of light is measured to measure the distance to an object to be observed. Any method can be used to acquire three-dimensional information as long as at least the ranges of social distance can be measured with a required resolution. In particular, the TOF method is suitable in that it can accurately measure a depth distance of several centimeters to several meters.

It is desired that the range of space imaged by the stereoscopic camera SC is large enough for the user to recognize the social distance space. For example, a space extending up to 3.6 m in depth at an angle of 30°, resulting in an angle of view of 60° or more, is suitable. For example, when the angle of view is 800 or more, corresponding to a wide-angle lens of 25 mm focal length in 35 mm equivalent, it is possible to capture an image of a space with a sense of realism. Further, a minimum angular resolution $\Delta\alpha$ is preferably 0.033° or less, which is a resolution corresponding to a visual acuity of about 0.5.

For example, when the stereoscopic camera SC has a high definition resolution (1080×1920 pixels) and the minimum angular resolution $\Delta\alpha$ is set to 0.0330 or less, the angle of view is 730 or less. Further, when the stereoscopic camera SC has a 4K resolution (2160×3840 pixels), the minimum angular resolution $\Delta\alpha$ is 1460 or less. Therefore, in imaging of the social distance space at an angle of view of 80° or more, it is desired to use a stereoscopic camera SC having a 4K or higher resolution.

The communication unit CM exchanges three-dimensional information with external devices via the digital communication network NW capable of stable transfer of moving images of three-dimensional information. For stable transfer of 4K resolution images and moving images including depth information for each pixel, the communication speed is preferably 25 Mbps or higher, for example. When a mobile communication network is used as the digital communication network, information can be easily exchanged with remote locations by using 5G or higher standards, for example.

The three-dimensional display 3D is a computer device such as a PC (Personal Computer), a server device, or a cloud server configured to display three-dimensional images. The three-dimensional display 3D may include, for example, a calculation unit 31, a control unit 32, a light source unit 33, a display unit 34, a light control unit 35, and a storage unit 36. The three-dimensional display 3D described herein is an example of a "light beam reproduction device." The calculation unit 31 is an example of a "signal processing unit." The control unit 32 is an example of a "signal processing unit." The display unit 34 is an example of a "stereoscopic image display unit." The light control unit 35 is an example of a "stereoscopic image display unit."

The calculation unit 31 and the control unit 32 are functional units (signal processors) that perform signal processing, and may be implemented by, for example, a CPU (Central Processing Unit) of the three-dimensional display 3D executing programs pre-stored in the storage unit 36. Further, these functional units that perform signal processing may also be implemented as an integrated circuit such as an ASIC (Application Specific Integrated Circuit).

The calculation unit 31 calculates components of a light beam (direction and intensity of a light beam) to be reproduced (displayed) for each element cell based on the three-dimensional information acquired from the stereoscopic camera SC. The details of the element cell will be described later.

The control unit 32 controls the light source unit 33, the display unit 34, and the light control unit 35 to reflect the direction and intensity of the light beam reproduced for each element cell. Accordingly, a natural sense of distance and a space with no blurring can be displayed. In addition, when the light source unit 33 and the light control unit 35 in the three-dimensional display 3D are passive and do not need to be controlled, the control unit 32 does not need to control these functional units (the light source unit 33 and the light control unit 35).

When images are displayed using only the three-dimensional information externally acquired via the communication unit CM without using three-dimensional information acquired from the stereoscopic camera SC, the stereoscopic camera SC in the three-dimensional spatial display system 1S can be omitted. On the other hand, when images are displayed on the three-dimensional display 3D using only the three-dimensional information from the stereoscopic camera SC, the communication unit CM in the three-dimensional display 3D can be omitted.

The light source unit 33 is a functional unit having a light source function including a light emitter such as a laser, LED (Light-Emitting Diode), EL (Electro-Luminescence), or the like, and serving as a light source of the display unit 34. The light control unit 35 controls, according to a control signal from the control unit 32, the direction and intensity of light emitted from the light source unit 33.

The display unit 34 has a display function using a display element such as LCD (Liquid Crystal Display), OLED (Organic LED) or DMD (Digital Mirror Device). The display unit 34 displays images under the control of the control unit 32.

Typical examples of the display unit 34 include display devices that display two-dimensional images, such as LCD, LED, OLED, and DLP (Digital Light Processing). However, the invention is not limited thereto. The display unit 34 may be a type of scanning the light source unit 33 such as a laser light source or an LED light source. In the case of a self-luminous device such as an LED or an OLED, the display unit 34 has both the light source function and the display function. If the display unit 34 can control the direction of light using a diffraction pattern such as a hologram, both the display function and the light control function can be implemented by a single device.

In the following description, a display surface 34a (see e.g., FIG. 25) refers to a surface on which a pattern is displayed by a display device of the display unit 34, and, when an image is displayed using a plurality of display devices, refers to a surface closest to the observer.

The storage unit 36 is configured with a storage medium such as a HDD (Hard Disk Drive), a flash memory, an EEPROM (Electrically Erasable Programmable Read Only Memory), a RAM (Random Access read/write Memory), a ROM (Read Only Memory), or any combination of these storage media. The storage unit 36 stores programs for executing various processes of the three-dimensional display 3D, and temporary data used when executing various processes. The storage unit 36 stores three-dimensional information acquired by, for example, the stereoscopic camera SC. The storage unit 36 stores calculation results from the calculation unit 31. The storage unit 36 stores information indicating the direction, intensity, and the like of a light beam reproduced under the control of the control unit 32.

Figure 19:
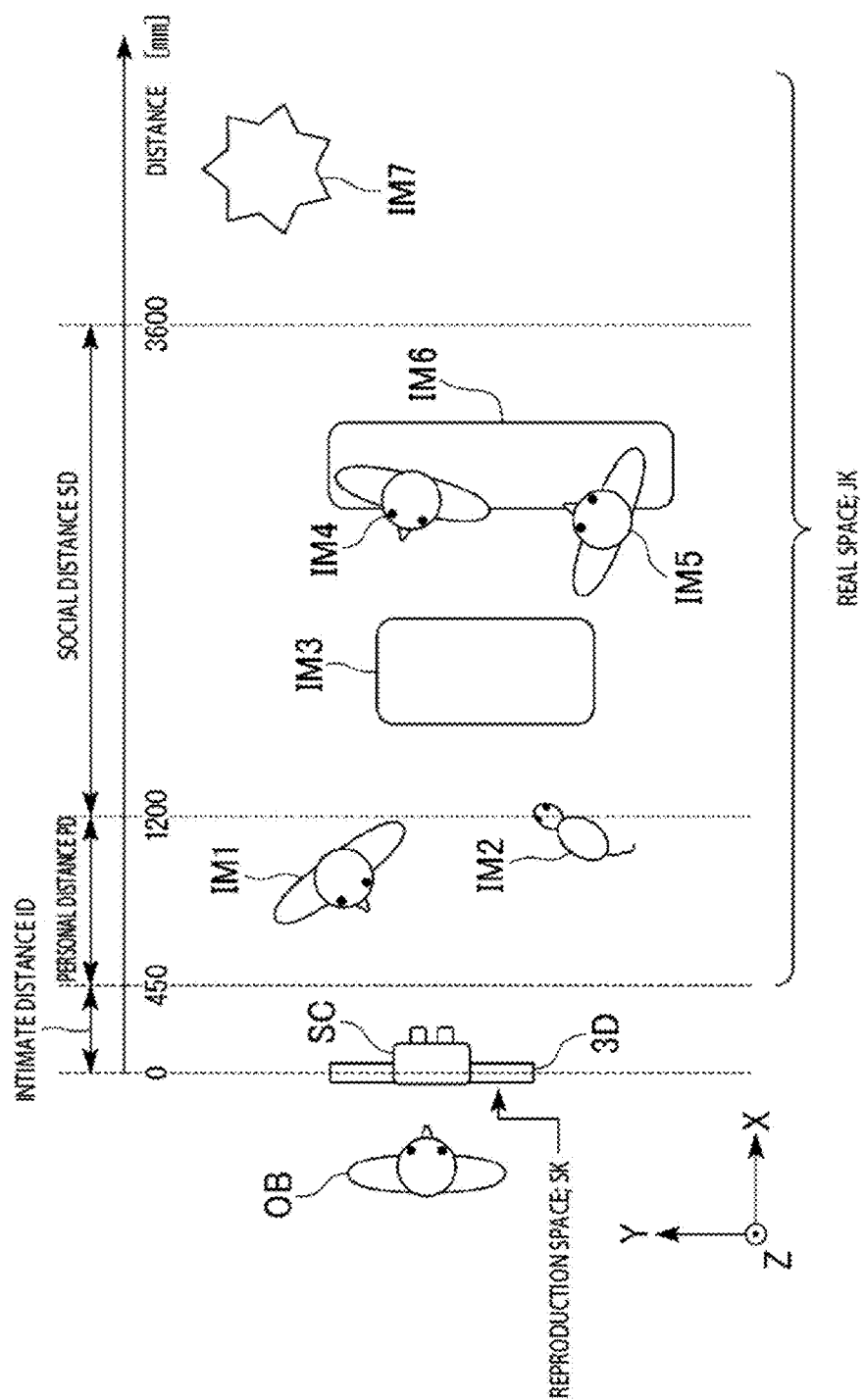
FIG. 19 is a diagram illustrating an example to which a three-dimensional spatial display system of the third embodiment is applied.

FIG. 19 is a diagram illustrating an example to which a three-dimensional spatial display system 1S of the third embodiment is applied. In FIG. 19, the XY direction indicates a planar direction and the Z direction indicates a vertical direction. The stereoscopic camera SC is installed to be able to image a real space JK to be observed. In the real space JK, a plurality of real objects IM (real objects IM1 to IM7) are disposed. The three-dimensional display 3D is installed so that the displayed image can be observed by an observer OB.

The stereoscopic camera SC is configured to image the real space JK. The three-dimensional display 3D displays a reproduction space SK that reproduces (displays) the real space JK imaged by the stereoscopic camera SC. In the example shown in FIG. 19, the stereoscopic camera SC is illustrated as overlapping the three-dimensional display 3D, but they are located at different positions in the Z direction and do not overlap each other. Further, in this example, the imaging direction of the stereoscopic camera SC is illustrated as being parallel to the X axis direction, but the invention is not limited thereto. The stereoscopic camera SC may be located at any position as long as it can image the real space JK to be observed from any position or in any direction that the observer OB desires to observe. Further, the stereoscopic camera SC is not limited to a single device, and a plurality of stereoscopic cameras SC may be installed.

In the example shown in FIG. 19, the three-dimensional spatial display system 1S functions as a three-dimensional image display communicator that enables communication in which recording (imaging) and reproduction (display) of three-dimensional information are performed at different timings. That is, after the three-dimensional information of the real space JK imaged by the stereoscopic camera SC is temporarily stored in the storage unit 36, a desired three-dimensional image is reproduced in the reproduction space SK at an arbitrary time desired by the observer OB. Accordingly, even when the observer OB is absent at the time of imaging, the real object IM in the real space JK at the time of imaging can be observed at an arbitrary timing after the imaging.

In the above example, recording and reproduction are performed at different timings, but the invention is not limited thereto. For example, the stereoscopic camera SC and the three-dimensional display 3D may be installed at separate locations, such as an entrance and a living room, so that they function as a three-dimensional video communicator that enables communication between users at separate locations where they cannot directly see the other. Accordingly, the observer OB can remotely experience (observe) the real space JK without needing to enter the real space JK.

The social distance space described herein will be described in detail. Unlike a space displayed by a conventional three-dimensional display (stereoscopic image display device), the social distance space is a space in which an object (subject) is not present in the vicinity of the display. The social distance space is a space in which a subject is present at a position away from the display in the depth direction in the space displayed on the display. For example, the social distance space may be a space in a room, a space in a park, or the like where an observer (subject) is inside the space. Alternatively, by using the display as a window, the social distance space may be a space displayed on the display when observing a space outside the window (such as a space inside a room).

Edward Hall, an American cultural anthropologist, classified interpersonal distances (personal spaces) between people into the following four distance zones:
1) Intimate distance,
2) Personal distance,
3) Social distance, and
4) Public distance.

1) As shown in FIG. 19, an intimate distance ID is an interpersonal distance of about 0 to 0.45 m, corresponding to a distance at which a person can recognize, for example, the other person's body temperature or scent. The intimate distance is a distance between people who are in a very close relationship, and is an interpersonal distance which mainly involves skin-to-skin contact such as holding hands or communication by scent.

2) A personal distance PD is an interpersonal distance of about 0.45 to 1.2 m, corresponding to a distance at which a person can maintain independence from the other. The personal distance is a distance within arm's reach, and is an interpersonal distance for communication between close partners such as friends.

3) A social distance SD is an interpersonal distance of about 1.2 to 3.6 m, at which physical contact with each other is difficult, which is suitable for communication at a public place, such as conversations with colleagues at work.

4) A public distance is an interpersonal distance of about 3.6 m or more, which is inappropriate for communication between two individuals, and suitable for communication such as speeches and lectures, for example.

Figure 20:
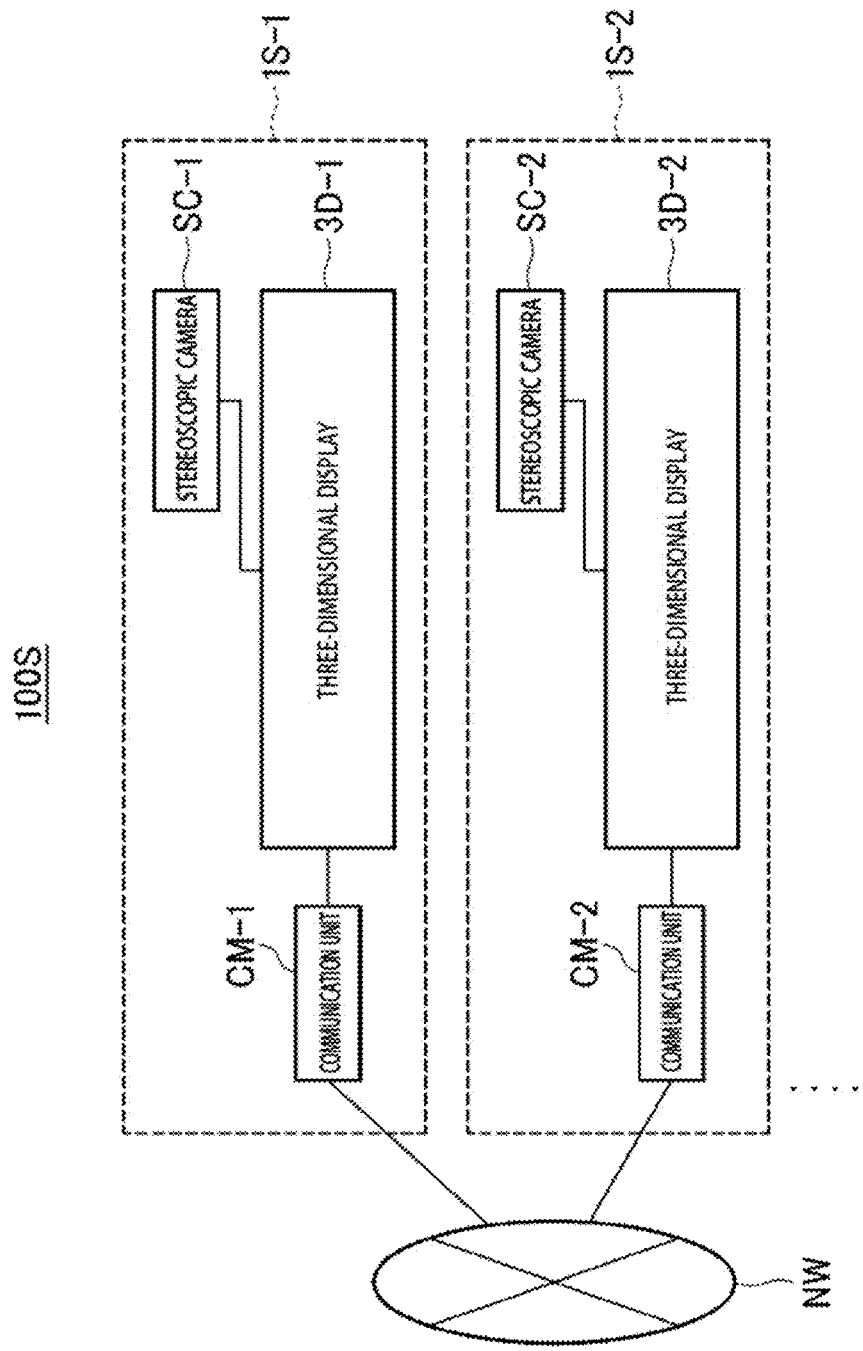
FIG. 20 is a block diagram illustrating a configuration of a three-dimensional spatial display system of a fourth embodiment.

FIG. 20 is a block diagram illustrating a configuration of a three-dimensional spatial display system 100S of a fourth embodiment. The three-dimensional spatial display system 100S of the present embodiment includes a plurality of three-dimensional spatial display systems 1S (1S-2, 1S-2, etc.) shown in FIG. 18, which are connected to each other via the digital communication network NW. With this configuration, a three-dimensional image display communicator that enables smooth communication among a plurality of locations is provided. The three-dimensional information acquired by the stereoscopic cameras SC (SC-1, SC-2, etc.) is compressed and/or converted as appropriate through signal processing by the calculation unit 31 or the like, and transmitted to a communication destination via the communication units CM (CM-1, CM-2, etc.).

Although there is no particular restriction on a communication means by the communication unit CM, a communication means capable of transmitting a large amount of information at high speed, such as the 5G communication network described above, is preferred for transmittance and reception of three-dimensional information.

Figure 21:
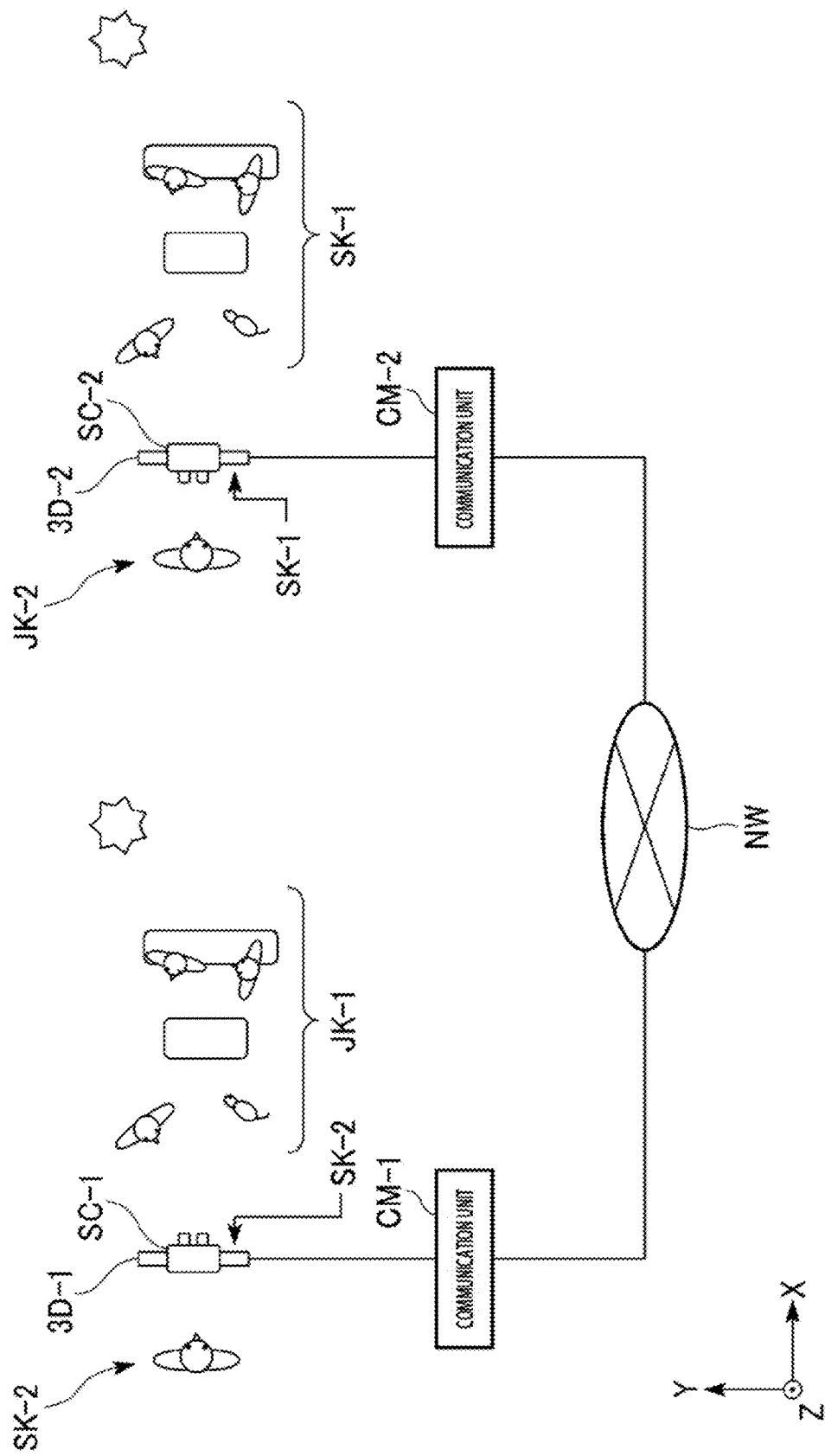
FIG. 21 is a diagram illustrating an example to which a three-dimensional spatial display system of the fourth embodiment is applied.

FIG. 21 is a diagram illustrating an example to which a three-dimensional spatial display system 100S of the fourth embodiment is applied. In FIG. 21, the XY direction indicates a planar direction and the Z direction indicates a vertical direction. Since the positions, directions and the number of the installed stereoscopic cameras SC are the same as those in FIG. 19, the description thereof will be omitted. The same applies to the three-dimensional displays 3D. In the example shown in FIG. 21, the three-dimensional spatial display system 100S functions as a three-dimensional image display communicator that enables smooth communication between two remote locations that are communicably connected to each other via the digital communication network NW.

That is, the stereoscopic camera SC-1 images members present in a real space JK-1 to acquire three-dimensional information, which is in turn transmitted to a three-dimensional display 3D-2 via the digital communication network NW. Accordingly, the three-dimensional display 3D-2 displays a reproduction space SK-1 that reproduces the space (real space JK-1) imaged by the stereoscopic camera SC-1.

On the other hand, the stereoscopic camera SC-2 images a member (in this example, one person) present in a real space JK-2 to acquire three-dimensional information, which is in turn transmitted to a three-dimensional display 3D-1 via the digital communication network NW. Accordingly, the three-dimensional display 3D-1 displays a reproduction space SK-2 that reproduces the space (real space JK-2) imaged by the stereoscopic camera SC-2.

Figure 22:
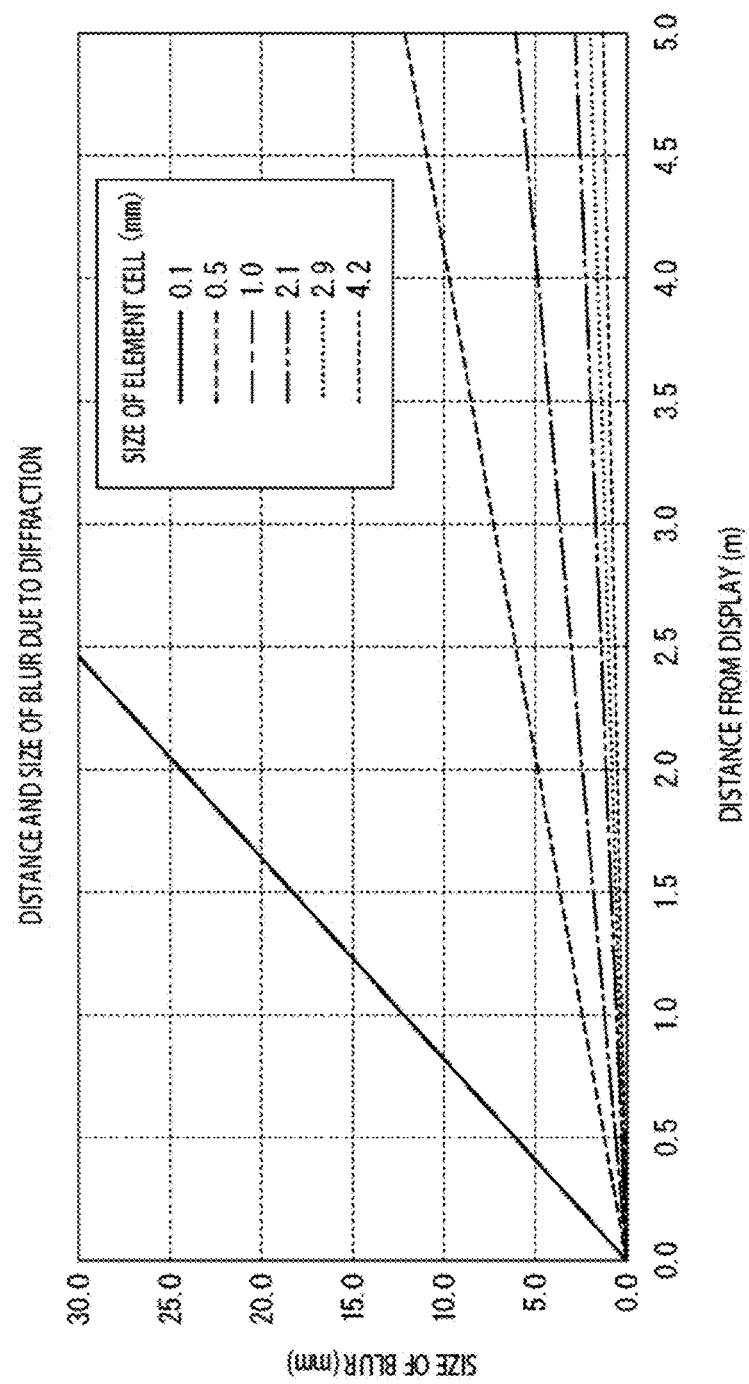
FIG. 22 is a characteristic diagram showing the relationship between a distance from a three-dimensional display to an object to be observed and a size of blur that occurs in reproduction of the object.

In the following description, the element cell of the present embodiment will be described with reference to FIG. 22. FIG. 22 is a characteristic diagram showing the relationship between a distance from the three-dimensional display 3D to an object to be observed and a size of blur produced in reproduction of the object. The horizontal axis in FIG. 22 represents the distance from the display. The vertical axis in FIG. 22 represents the size of blur.

Figure 30:
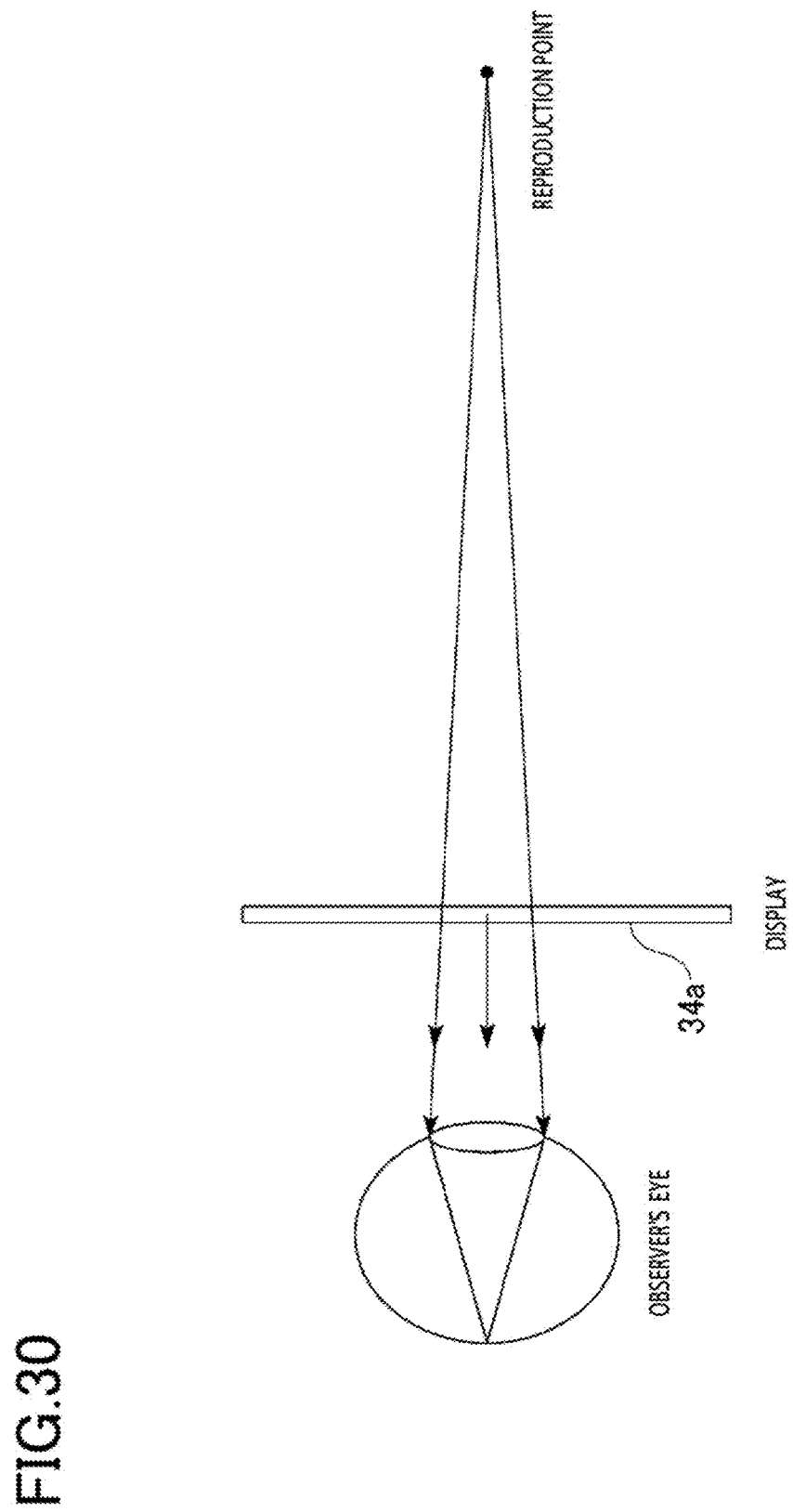
FIG. 30 is a schematic diagram illustrating an example in which an observer observes a reproduction point through a display surface.

In general, as shown in FIG. 30, with a display capable of focus adjustment, an observer observes, through a display surface 34a, a space in front of and behind the display surface 34a. When light beams in the same direction as those diverging from a reproduction point, which is a point object to be reproduced, are reproduced in a size smaller than the observer's pupil, the observer can perceive as if the point light source exists in the space.

Figure 31:
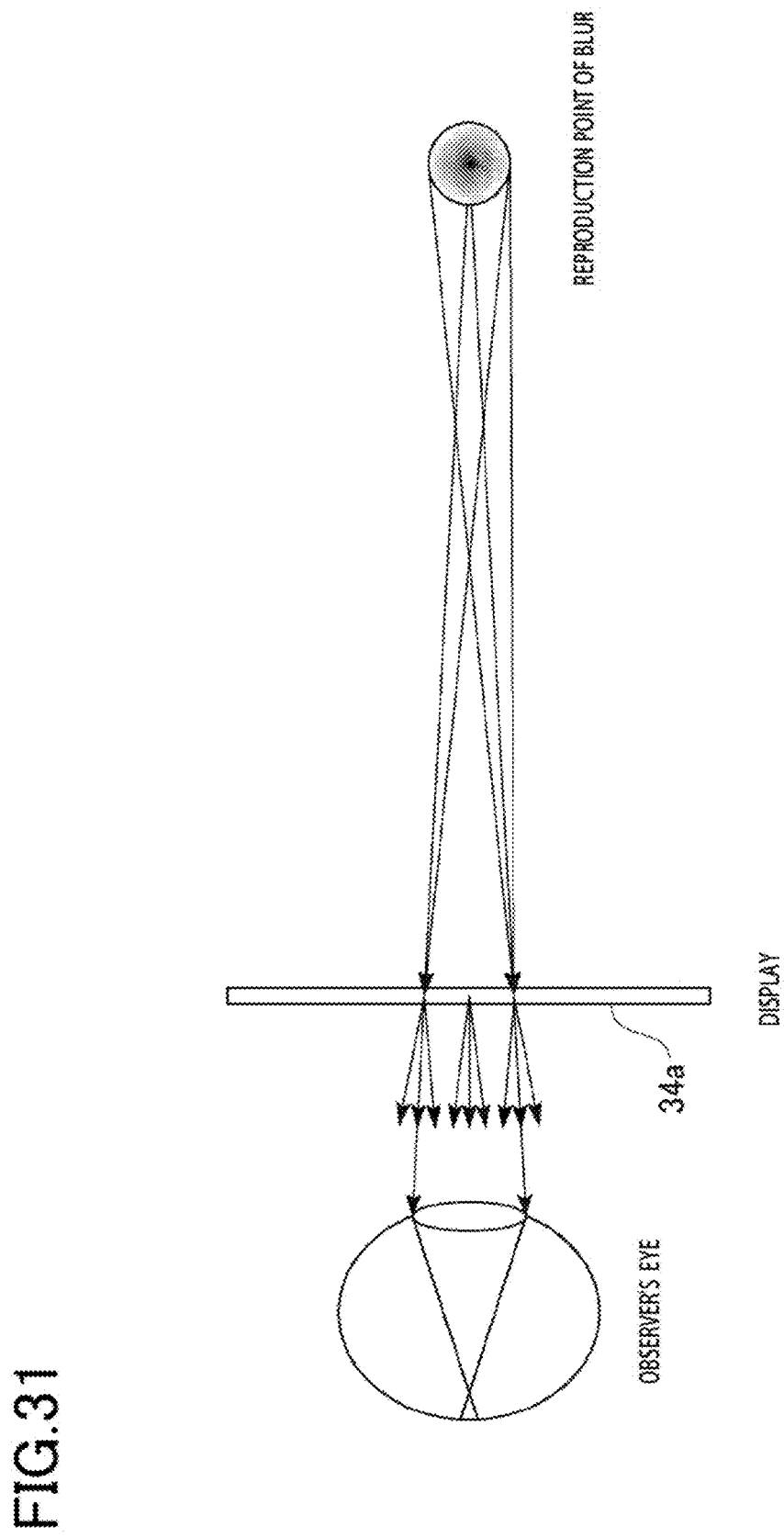
FIG. 31 is a schematic diagram illustrating an example in which light beams reproduced from a display become diverging light, and a reproduction point is blurred.

However, in a strict sense, the light beams reproduced through the display diverge as shown in FIG. 31 due to various causes, resulting in blurring in the reproduced image. In particular, when the display has small element cells, which determine the direction of a light beam, light spreads out from the apertures of the element cells due to the effect of diffraction, resulting in blurring.

The divergence due to diffraction from the aperture can be approximated as Fraunhofer diffraction at a position away from the display surface 34a, and when the aperture is circular, a divergence angle can be obtained from the size of an airy disk (a bright region produced at the center of the diffraction pattern). That is, when a distance between a minimum dark ring formed in a far field away from the circular aperture and an optical axis is represented by the divergence angle θ of a light beam parallel to the optical axis and passing through the end face of the circular aperture, the following formula holds (see FIG. 32). In the following (formula 3), λ is the wavelength of light, and d is the diameter of the circular aperture.

$$\theta = 1.22 \times \lambda / d \quad \text{(formula 3)}$$

The above aperture is a unit of area on the display that defines the direction of a light beam. Such a unit is referred to as an "element cell." Hereinafter, the element cell is denoted by reference sign C. A set of a plurality of element cells C is also referred to as an element cell set. For example, in the light field display (FIG. 36) using a microlens array, each lens corresponds to the element cell C. Further, in the static display-type light field display (FIG. 37) in which liquid crystal panels and the like are stacked, each pixel of the display used corresponds to the element cell C.

In the light field display, the direction of a light beam is controlled for each element cell C. Therefore, in order to impart a focus adjustment function, the element cell C needs to be sufficiently smaller than the observer's pupil. In general, the human pupil size is about 2 to 8 mm. When the size of the element cell C is 0.3 mm and the wavelength of light is 500 nm, the divergence angle of a light beam is represented as follows based on (formula 3).

$$\theta = 1.22 \times 500 \times 10^{-6} / 0.3 \approx 2.03 \times 10^{-3} (\text{rad}) \approx 0.12(°)$$

Figure 32:
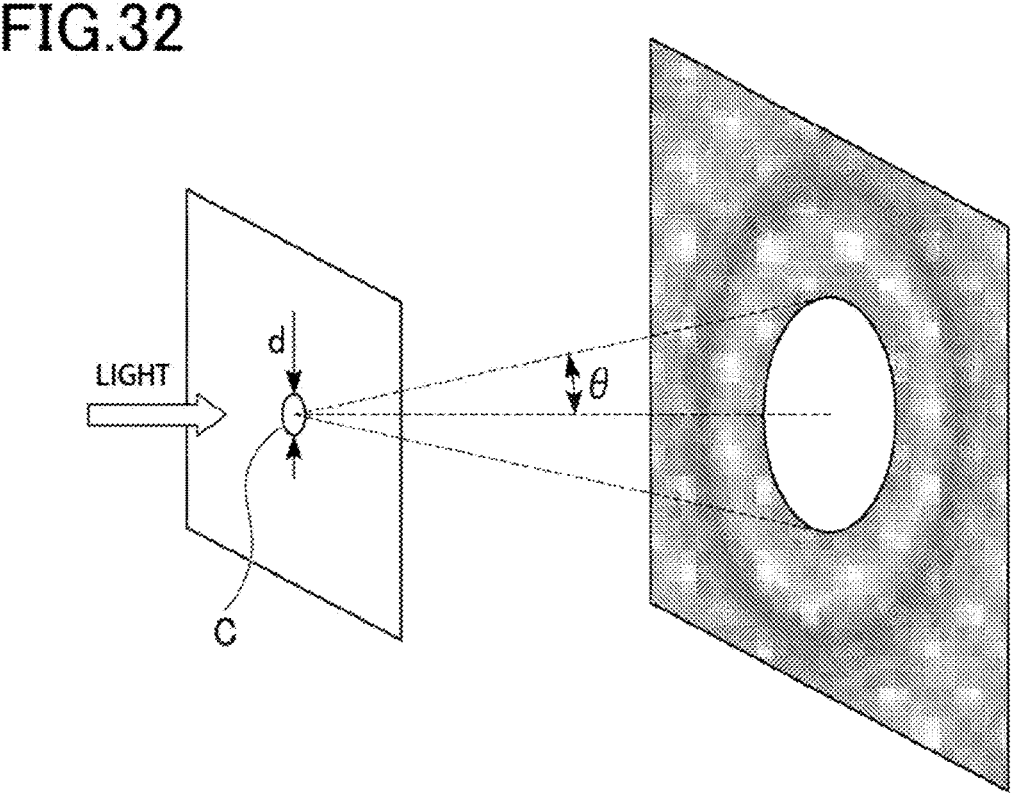
FIG. 32 is a schematic diagram illustrating a divergence angle of Fraunhofer diffraction due to a circular aperture and its size.

That is, in FIG. 32, the size of blur due to the light beam that has passed through the element cell C of 0.3 mm at a distance L=3.6 m from a surface having the circular aperture becomes 3600×tan (0.12°)×2≈15 (mm), resulting in occurrence of blur of about 15 mm length. For example, if the face of a person at a distance of 3.6 m is blurred by about 15 mm, it is possible to recognize the person but difficult to read the facial expressions.

In general, a person with a visual acuity of 1.0 has an angular resolution of 1/60° with the naked eye. The size d of the element cell C having the corresponding divergence angle θ due to diffraction can be represented as follows, when the wavelength is 500 nm, based on (formula 3).

$$d = 1.22 \times 500 \times 10^{-6} / \tan(1/60°) \times 2 = 4.2 \text{mm}$$

Similarly, the size of the element cell C producing blur and having the angular resolution of 1/60/0.7° corresponding to that of a person having a visual acuity of 0.7, which is a requirement for a driver's license, is 2.9 mm. The minimum visual acuity that does not require wearing of glasses is 0.3, and according to the same calculation under this condition, the size of the element cell C producing blur is 1.2 mm. Under the condition of the visual acuity of 0.2, the size of the element cell C producing blur is 0.8 mm. As seen from the above, the size d of the element cell C should be at least 0.8 mm or more in order to suppress blurring to an allowable level in observation.

FIG. 22 shows the relationship between the distance L from the display and a size of blur due to diffraction, using the size d of the element cell C as a parameter. The size d of the element cell C corresponds to d in FIG. 32. That is, d is the size d of the element cell C calculated above, and corresponds to d=4.2 mm, 2.9 mm, 1.2 mm or 0.8 mm, which is the size calculated depending on the conditions.

As shown in FIG. 22, when the distance (L) from the display is the same, the size of blur is found to decrease with an increase in the size (d) of the element cell C. This reflects the fact that the divergence angle θ decreases as d increases in (formula 3).

Figure 23:
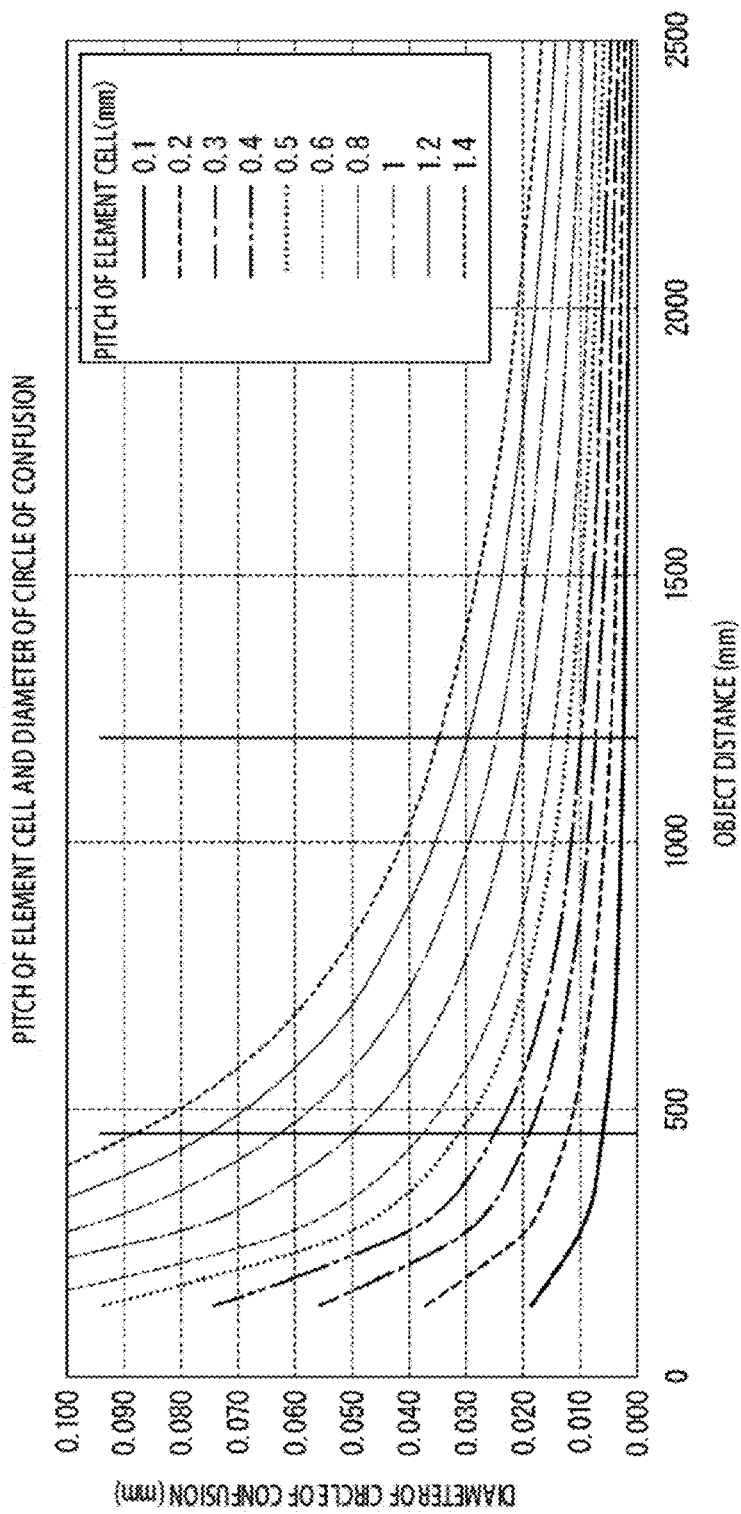
FIG. 23 is a characteristic diagram showing the relationship between a distance from a three-dimensional display to an object to be observed and a resolution (diameter of circle of confusion) of the retina of an observer seeing the reproduced object.

Referring now to FIG. 23, the interval (pitch p) at which the element cells C are arranged will be described. FIG. 23 is a characteristic diagram showing the relationship between a distance (object distance) from the three-dimensional display 3D to an object to be observed and a resolution (diameter of circle of confusion) of the retina of an observer seeing the reproduced object. The horizontal axis in FIG. 23 represents the distance from the display. The vertical axis in FIG. 23 represents the diameter of circle of confusion.

In general, the human pupil size is about 2 to 8 mm, and the focus of the eye is adjusted by a plurality of light beams passing through the pupil. In order to achieve such focus adjustment, the element cells C need to be arranged at an interval (pitch p) at which light beams from at least two or more element cells C enter the pupil. A larger number of light beams that enter the pupil (the number of element cells C) is more preferred for more natural focus adjustment. That is, it is preferred to decrease the interval (pitch p) between the element cells C to increase the number of element cells C.

As shown in FIG. 23, when the distance (L) from the observer to the object is the same, the diameter of circle of confusion is found to decrease with a decrease in the pitch (p) of the element cell C. Since the distance between photoreceptors in the human retina is about 10 μm (0.01 mm), the pitch p of the element cell C needs to be about 0.4 mm or less in order to obtain further higher resolution (smaller diameter of circle of confusion) when an object is at a distance farther than 1.2 m.

Further, for applications in which a resolution of a 24-inch XGA (Extended Graphics Array: a standard introduced by IBM in 1990) display at a distance of 0.5 m (a diameter of circle of confusion of about 30 μm (0.03 mm) on the retina) is allowed, the pitch p of the element cell C may be 1.2 mm or less when an object is at a distance farther than 1.2 m.

Summarizing the above, when communication is performed with the social distance SD (the range of distance from about 1.2 m to about 3.6 m from the display), it is possible to communicate without any practical problem when the size d of the element cell C is 0.8 mm or more and the pitch p of the element cell C is 1.2 mm or less.

Although the horizontal axis of FIG. 23 is a distance from the observer to the object, the distance from which the observer observes the display surface 34a of the device is unknown at the time of design. Therefore, at the time of design, the distance when the observer comes closest to the display surface 34a, that is, the distance from the display surface 34a to the object is taken as the distance from the observer to the object.

Figure 24:
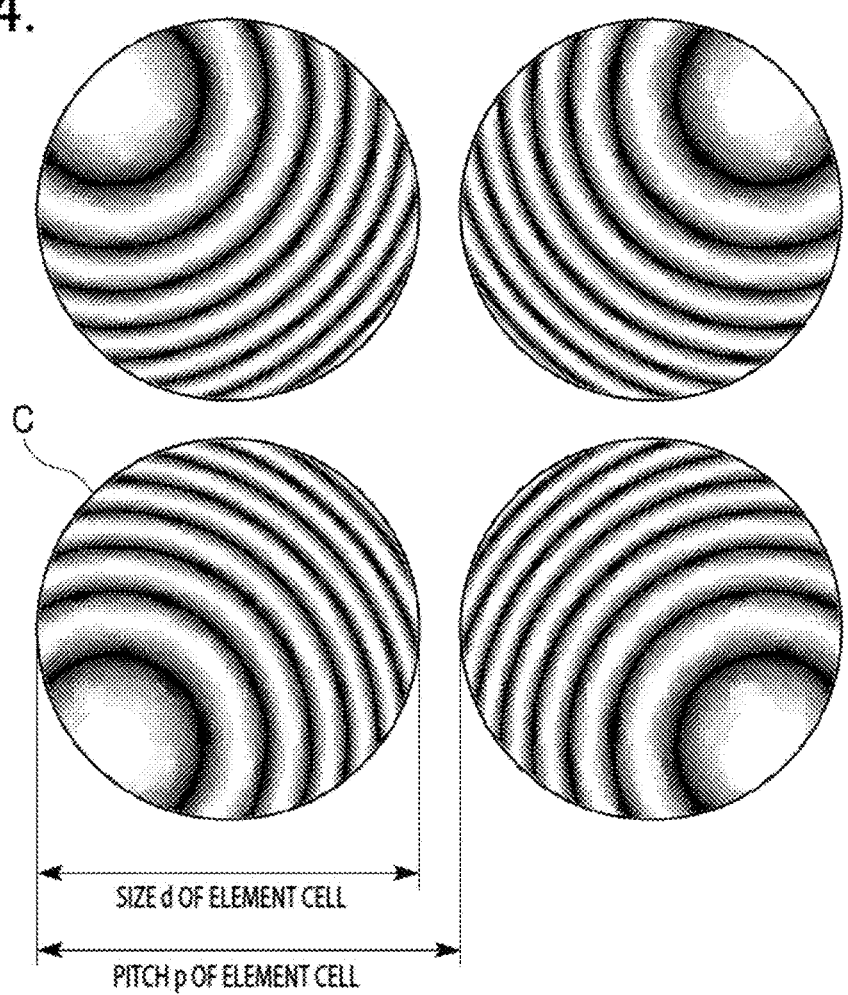
FIG. 24 is a diagram showing an example relationship between a size d of an element cell and a pitch p.

FIG. 24 is a schematic diagram of the case where the pitch p of the element cell C is larger than the size d of the element cell C (p≥d). This is an example in which the size d of the element cell C is 0.8 mm or more and the pitch p of the element cell C is 1.2 mm or less. In this case, in which the relationship of p≥d is satisfied, the element cells C do not overlap each other. Therefore, the diffraction grating patterns (diffraction patterns) are also independent from each other without overlapping.

Figure 25:
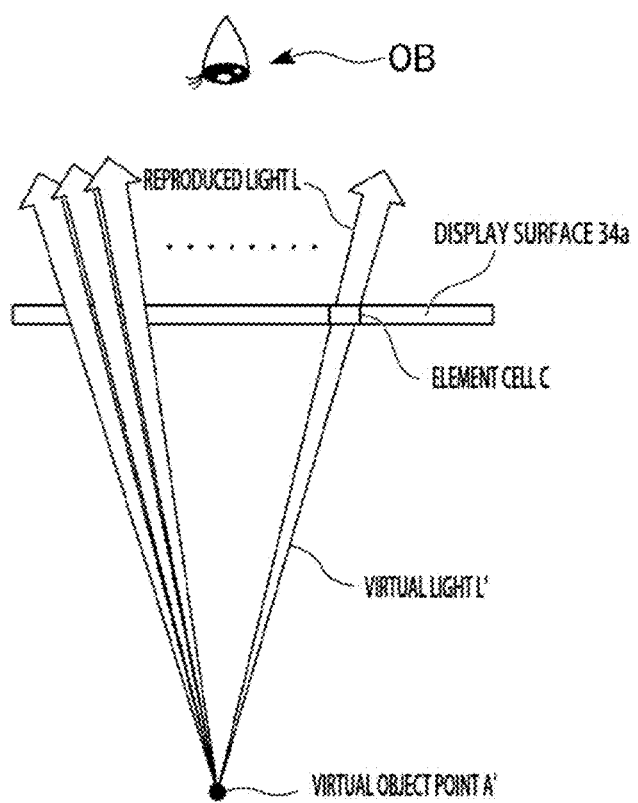
FIG. 25 is a diagram showing an example in which a point object is reproduced as an object point A'.

FIG. 25 is a schematic diagram of an example in which a point object is reproduced as an object point A' by the display of the present invention. Each element cell C on the display surface 34a reproduces the direction of light (virtual light L') diverging from the object point A'. When observing in various directions from the upper side in the drawing (that is, when the observer OB observes the display surface 34a in various directions), the observer OB can perceive, in each direction, as if the object point A' exists.

In the present embodiment, as described above referring to FIG. 23, the pitch p of the element cell C is assumed to be sufficiently small relative to the pupil size. Further, as described above referring to FIG. 22, the size d of the element cell C is assumed to be a size that reduces blurring due to diffraction. Accordingly, conditions necessary for stereoscopic vision, such as convergence, focus adjustment and binocular parallax, are reproduced to the observer OB without any inconsistency. Therefore, the observer OB does not experience eye strain. That is, even when a space is not in the vicinity of the display surface 34a and away from the display surface 34a, the space can be reproduced naturally without a sense of discomfort.

On the other hand, as shown in FIG. 25, a light beam (reproduced light L) emitted from each element cell C has a width corresponding to the size (d) of the element cell C+divergence (Δα) due to diffraction. As a result, although there is no problem in observing a space far from the display surface 34a, observing a space in the vicinity of the display surface 34a results in a decrease in resolution of an object.

Figure 26:
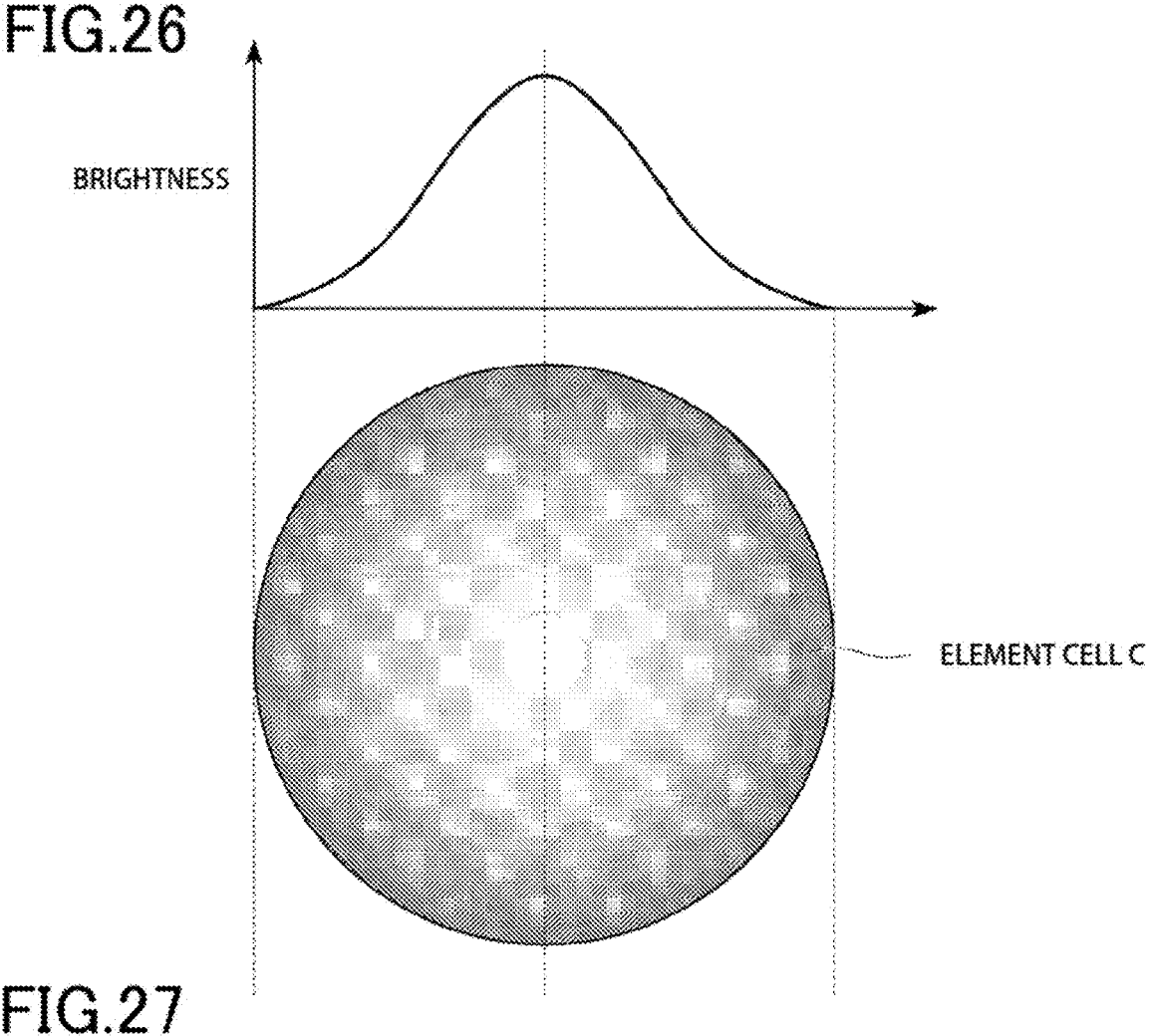
FIG. 26 is a diagram showing an example of brightness distribution of a light beam (reproduced light) reproduced from an element cell.

In order to solve the above problem, several methods are possible. For example, as shown in FIG. 26, a brightness distribution of a light beam reproduced from the element cell C can be a characteristic distribution. FIG. 26 is a diagram showing an example of brightness distribution of a light beam (reproduced light L) reproduced from the element cell. The upper view in FIG. 26 is a characteristic diagram showing the relationship between the position in the element cell C and the brightness of the reproduced light L. The lower view in FIG. 26 is a schematic diagram showing how the brightness of the reproduced light L emitted from the element cell C is distributed.

As shown in FIG. 26, the brightness of a light beam reproduced from the element cell C is distributed such that it is highest at the center and decreases toward the periphery. According to this distribution, the resolution of the reproduced object can be improved. Such a brightness distribution of a light beam can be achieved by varying the diffraction efficiency in the element cell C so that the transmittance of the interference fringe pattern recorded in the element cell C decreases from the center toward the periphery.

Figure 27:
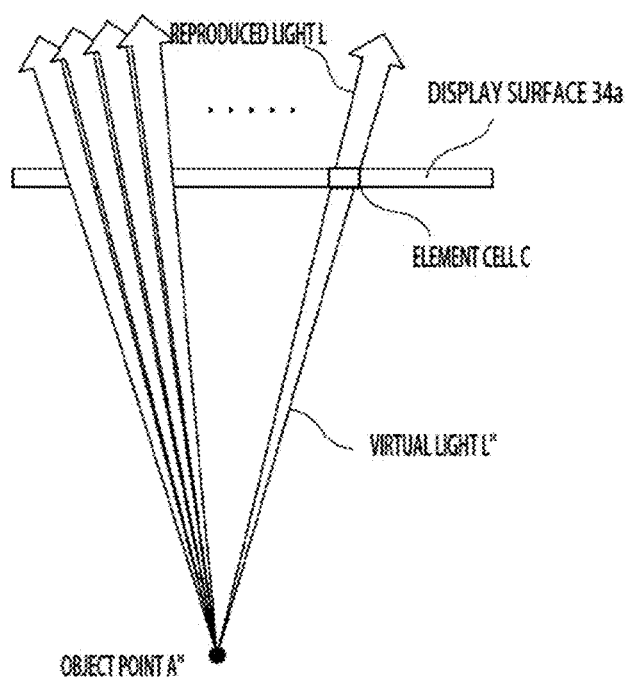
FIG. 27 is a diagram showing an example in which a point object is reproduced as an object point A''.

Further, another method of preventing a decrease in the resolution is, as shown in FIG. 27, adjusting the size of an object point A" produced by light beams of the reproduced light L reproduced from respective element cells C. That is, the element cell C is formed in which interference fringes between a spherical wave of the virtual light L" diverging from the object point A", that is, a wavefront from the object point, and reference light are recorded on the display surface 34a. Accordingly, as shown in FIG. 27, the size of the object point A" produced by light beams reproduced from respective element cells C can be reduced to the diffraction limit of the size d of the element cell C.

The above can be achieved by a method using, for example, a CGH (Computer-Generated Hologram) calculated for each element cell C. In this method, a hologram of the wavefront and the reference light when light (virtual light L") from the object reaches a position of the element cell C is calculated. In this method, calculation may be performed for each element cell C. Therefore, the amount of calculation is smaller than that of a normal CGH, as will be described later, and parallel calculation is also possible, which enables high-speed calculation.

In this case, a focus adjustment function can be satisfied by only one element cell C. Accordingly, even when the pitch p of the element cell C is 1.2 mm or more, a natural stereoscopic view is achieved. However, in order to smoothly change the image as the viewpoint of the observer OB moves, the pitch p of the element cell C is preferably smaller than or equal to the size of the pupil. Therefore, the pitch p of the element cell C is at least 7 mm or less, and preferably 2 mm or less. That is, when the element cell C is a hologram in which a spherical wave from an object is recorded, a stereoscopic image with improved resolution can be observed by setting the size d of the element cell C to 1.2 mm or more (corresponding to a visual acuity of 0.5) and setting the pitch p of the element cell C to 2 mm or less.

Figure 28:
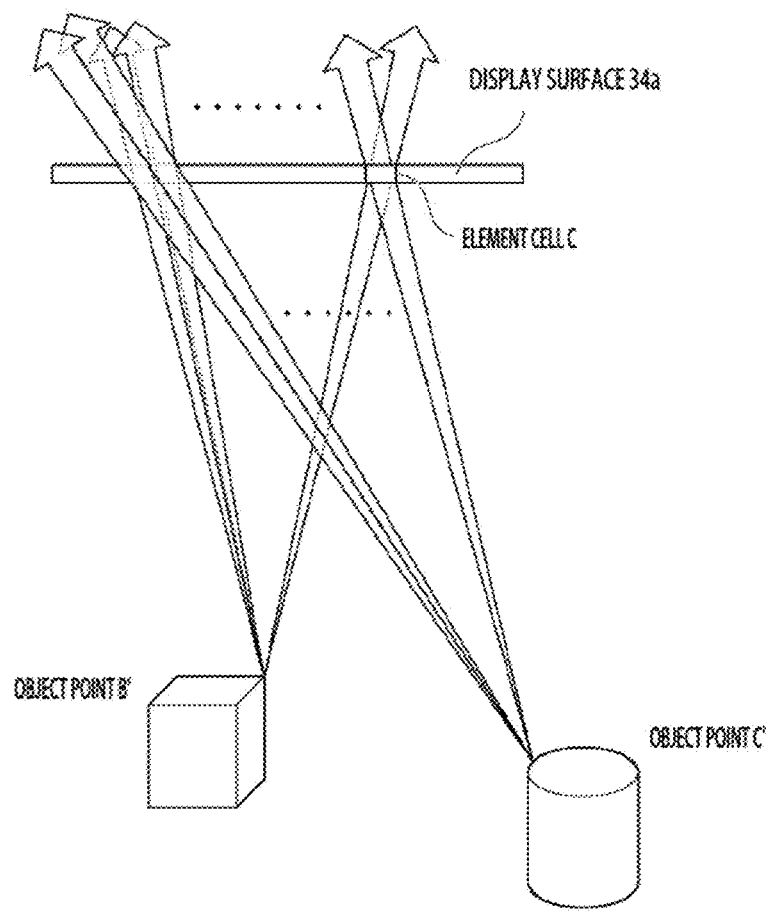
FIG. 28 is a diagram illustrating an example in which a plurality of objects are reproduced by a method of FIG. 27.

FIG. 28 is a diagram illustrating an example in which a plurality of objects are reproduced by the method shown in FIG. 27. In each element cell C on the display surface 34a, interference fringes between a spherical wave diverging from each point on a surface of the object and reference light are recorded. From an object B' located relatively close to the display surface 34a, a spherical wave diverging from a close light spot is reproduced. On the other hand, from an object C' located relatively far from the display surface 34a, a spherical wave diverging from a far light spot is reproduced. Thus, the wavefronts are recorded differently depending on the distance from the display surface 34a to the object.

Figure 29:
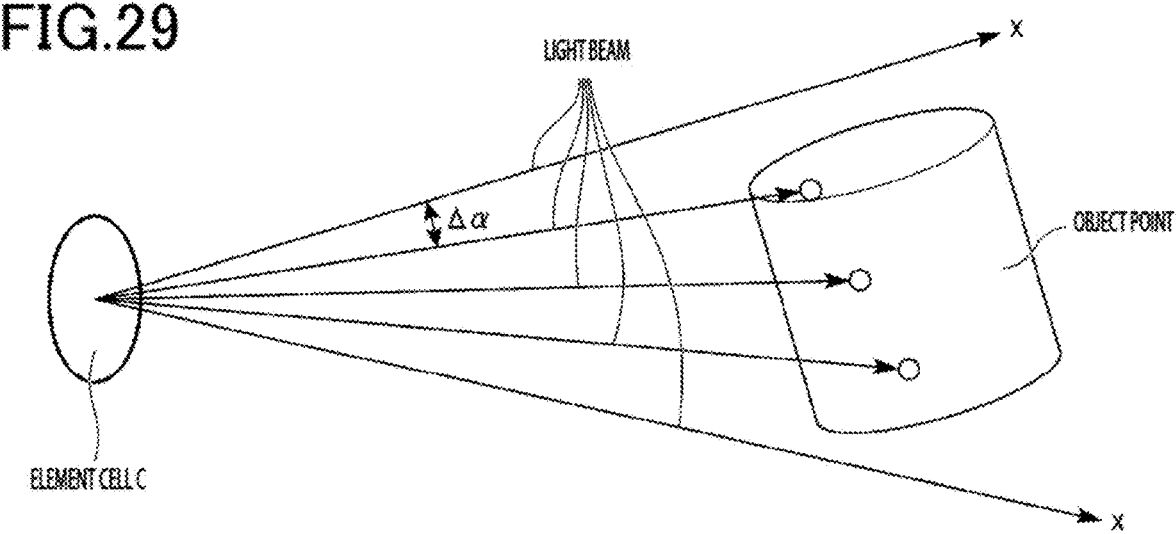
FIG. 29 is a diagram illustrating a method for calculating hologram reproduction data by applying a ray tracing method.

In the present embodiment, the interference fringes between a spherical wave diverging from each point on a surface of the object and reference light are digitized through the stereoscopic camera SC. Although this is common to a conventional digital hologram, the present embodiment is characterized in that the object is sampled. That is, as shown in FIG. 29, the object is sampled at points resolved by an angle Δα from each element cell position.

Accordingly, whereas the conventional digital hologram requires wavefront calculation at a sampling pitch on the order of μm, the method in the present embodiment requires sampling only at a pitch of several millimeters to several centimeters. Therefore, it is possible to reduce the enormous amount of calculation required in the conventional method.

In addition, according to the method of the present embodiment, the sampling interval (sampling pitch) increases as the distance from the display surface 34a increases. Therefore, the method of the present embodiment is suitable for reproducing a large space extending away from the display surface 34a.

In a holographic stereogram, a stereoscopic image is formed while reproducing a direction of a light beam. Therefore, it is possible to prepare data for displaying a three-dimensional image from images of an object imaged in a plurality of directions. This makes it possible to reproduce not only the shape of the object but also its texture, such as a glossy object or a transparent object, by using CG (computer graphics) techniques which have been studied using various methods. Further, by imaging the actual object, it is also possible to reproduce a stereoscopic image of the actual object.

For example, referring to FIG. 29, a method of calculating a hologram pattern by applying a ray tracing method, which is one of CG techniques, will be described. First, the center of each element cell C is set as a starting point of a light beam emitted by the ray tracing method. Next, the ray tracing method is performed with the center of each element cell C set as a starting point to obtain an intersection point between the light beam and an object, which is a subject to be imaged. As a result, each element cell C has a set of point light sources from different viewpoint positions, which makes it possible to create a pattern of element cells C having vertical and horizontal parallaxes. The object (subject) described herein may be a three-dimensional object created based on the three-dimensional information obtained from information captured by the stereoscopic camera SC, or may be a virtual object created using CAD (computer-aided design) or the like. When only the direction of the light beam is taken into account in this calculation, reproduction by light beams is performed as shown in FIG. 25. On the other hand, when both the direction of the light beam and the distance to the object point are taken into account in this calculation, reproduction by light beams is performed as shown in FIGS. 27 and 28.

Figure 33:
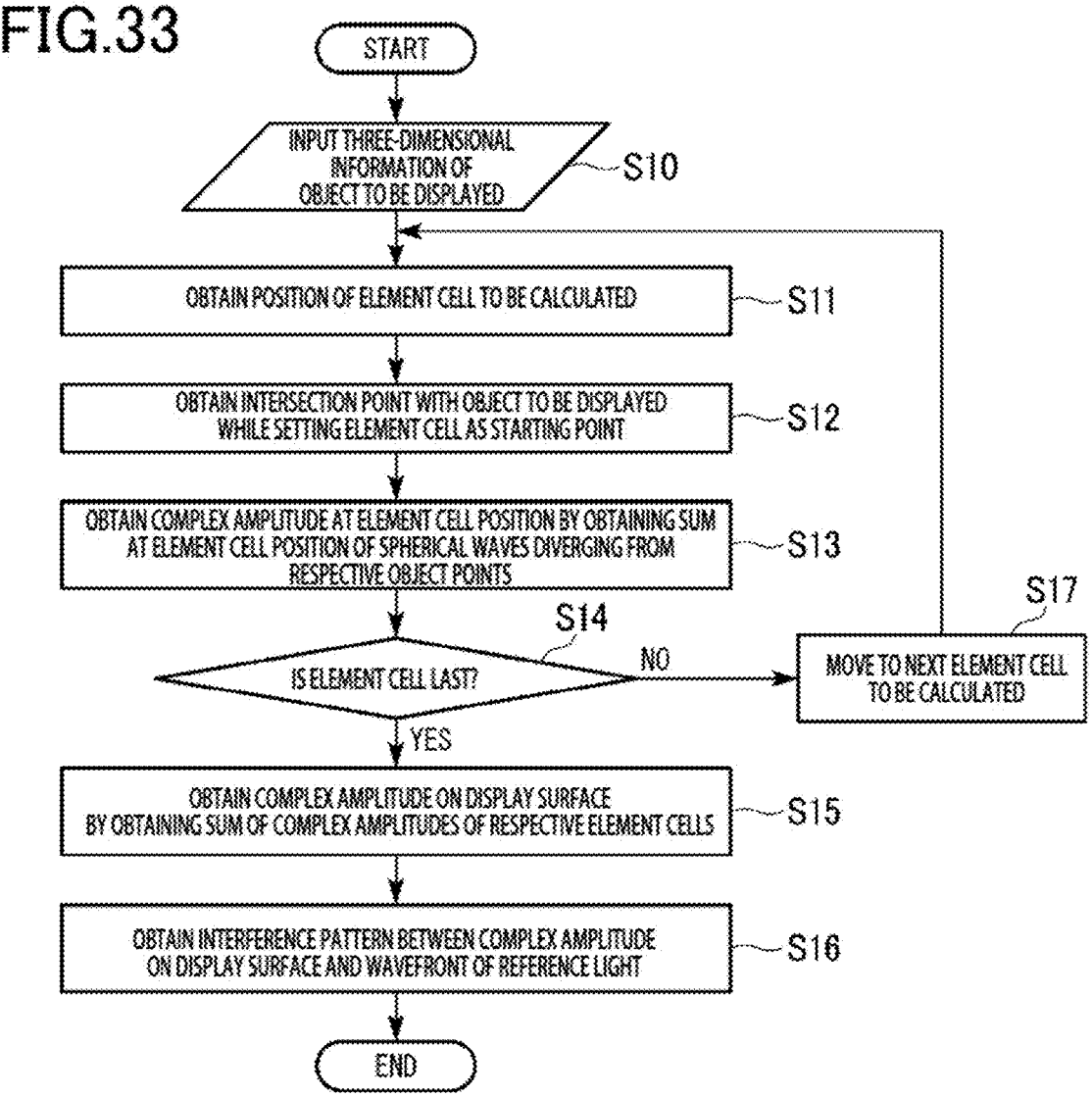
FIG. 33 is a flowchart showing a flow of a procedure performed by a three-dimensional display of an embodiment.

With reference to the flowchart of FIG. 33, a flow of a procedure performed by the three-dimensional display 3D of the embodiment will be described. FIG. 33 shows a flow of calculation of a hologram pattern, in which the direction of the light beam and the distance to the object point are taken into account.

First, the three-dimensional display 3D acquires three-dimensional information of an object to be displayed on a display (step S10). Next, the three-dimensional display 3D obtains a position of a center of the element cell C to be calculated (step S11), and, while setting the position of the center of the element cell C as a starting point, obtains an intersection point where each light beam emitted from the starting point at an angle different from the other by Δα intersects the object (step S12). Then, while setting the intersection point with the object as an object point, the three-dimensional display 3D obtains a sum of complex amplitudes at the element cell position of spherical waves diverging from respective object points (step S13). The complex amplitude obtained here may be within the range of the size of the element cell C.

The three-dimensional display 3D performs the above steps (steps S11 to S13) for all the element cells C (steps S14 and S17).

Then, the three-dimensional display 3D obtains a complex amplitude on the display surface 34a by obtaining a sum of complex amplitudes of all the element cells C (step S15). Next, the three-dimensional display 3D obtains a pattern of interference fringes between the wavefront of the reference light and the complex amplitude on the display surface 34a (step S16). Thus, the three-dimensional display 3D can obtain a pattern of a hologram to be displayed on the display.

In the procedure shown in the above flowchart, the sum of the complex amplitudes is obtained instead of the sum of the interference fringe patterns for each element cell C (step S15), and then the interference fringe patterns with the reference light are calculated (step S16). Thus, the three-dimensional display 3D can record and reproduce a three-dimensional image of an object as information including both the direction of the light beam and the distance to the object point.

In the procedure shown in the above flowchart, the interference pattern with the reference light is calculated after calculating the sum of the complex amplitudes of the element cells C, but the invention is not limited thereto. The three-dimensional display 3D may calculate the sum of the interference patterns after obtaining the interference pattern with the reference light for each element cell C. In this case, the three-dimensional display 3D can perform calculation for each element cell C. Accordingly, parallel calculation can be easily performed, and the time required for calculation can be shortened.

Further, a stereoscopic image to be recorded (three-dimensional information of an object) may be a stereogram that considers only horizontal parallax, but in order to make the effect of focus adjustment more effective, it is desired that a stereogram has both horizontal parallax and the vertical parallax. In the example described in the above embodiment, the element cell C is a circular cell, but the invention is not limited thereto. The shape of the element cell C may be a polygonal shape such as a triangle, a quadrangle, a pentagon or a hexagon, or may be a shape such as a star shape, an ellipse or a rectangle.

Further, a light source for reproducing a holographic stereogram may be a monochromatic light source such as a laser or an LED, or may be a light source in which a normal light source and a filter are combined. This can suppress occurrence of blurring due to difference in diffraction angle depending on the wavelength.

Further, when a laser light source is used as the light source, it is desirable to reduce coherence. This is for reducing speckle noise. The coherence of a laser light source can be reduced by allowing light to pass through an optical fiber, oscillating the light source, varying the optical path length, inserting a moving diffusion element into the optical path, or combining a plurality of light sources.

In the above description, the social distance SD from about 1.2 m to 3.6 m has been described as a target distance, but it is not always necessary that all the objects reproduced in a space are present within this range of distance. It is sufficient that objects to be mainly observed are present at least within the range of the social distance SD. Further, a target to be reproduced (object) is not limited to a person, but may also be an animal, a robot, or the like. Further, a target to be reproduced (object) may also be a two-dimensional image reproduced in a space. Moreover, a building that suggests the presence of a target to communicate with, for example, a desk, a chair, a table or the like placed in a space may be reproduced. A target to be reproduced may not necessarily be the one to directly communicate with. For example, when remotely controlling heavy machinery, a target to be observed, such as natural ground, may be present within the range of the social distance SD. The same applies to the cases of remote surgery, operation of a robot arm in outer space, operation of an unmanned reconnaissance aerial vehicle in the military, or the like.

As described above referring to FIGS. 22 and 23, even when the space has a depth larger than 3.6 m, the present invention can be used to reproduce a large space with less blur. For example, in order to display a large space such as a landscape of a space including huge objects such as buildings and large animals or plants, the present invention can be used to display a space exceeding the social distance SD.

When the display is observed through an optical system such as an eyepiece lens, the conditions for the size of the element cell C and the pitch p of the element cell may be corrected according to the magnification of the optical system. For example, a case is assumed in which a distance from the display is the social distance SD from about 1.2 m to about 3.6 m, the size d of the element cell C is 1.0 mm, and the pitch p of the element cell C is 1.2 mm when no eyepiece lens is used. In this case, when the present embodiment is applied to a head-mounted display or the like, and the eyepiece lens mounted on the head-mounted display or the like has a 2× magnification, the three-dimensional display 3D corrects the size d of the element cell C to 1.0/2=0.5 mm and the pitch p of the element cell C to 1.2/2=0.6 mm. Alternatively, when the magnification of the optical system is set to 0.5 using a reduction optical system, the three-dimensional display 3D corrects the size d of the element cell C to 1.0/0.5=2.0 mm and the pitch p of the element cell C to 1.2/0.5=2.4 mm.

That is, the corrected size d# and the corrected p# are represented by the following formulas. In the following formulas, d represents the size before correction, p represents the pitch before correction, and BR represents the magnification of an optical system such as an eyepiece lens.

$$d\# = d/BR$$

$$p\# = p/BR$$

Further, when the display surface 34*a* can be directly observed without using an eyepiece lens or the like, observation is preferably performed with both eyes simultaneously for obtaining a convergence effect. Since the average interocular distance is about 60 mm, the size of the display surface 34*a* is preferably at least 60 mm or more in the longitudinal direction.

Modified Examples of Embodiment

A modified example of the embodiment will be described below. The present modified example differs from the embodiment described above in that a virtually displayed object (hereinafter, referred to as a virtual object) is reproduced in a reproduction space. The virtual object may be, for example, a virtual character.

Figure 34:
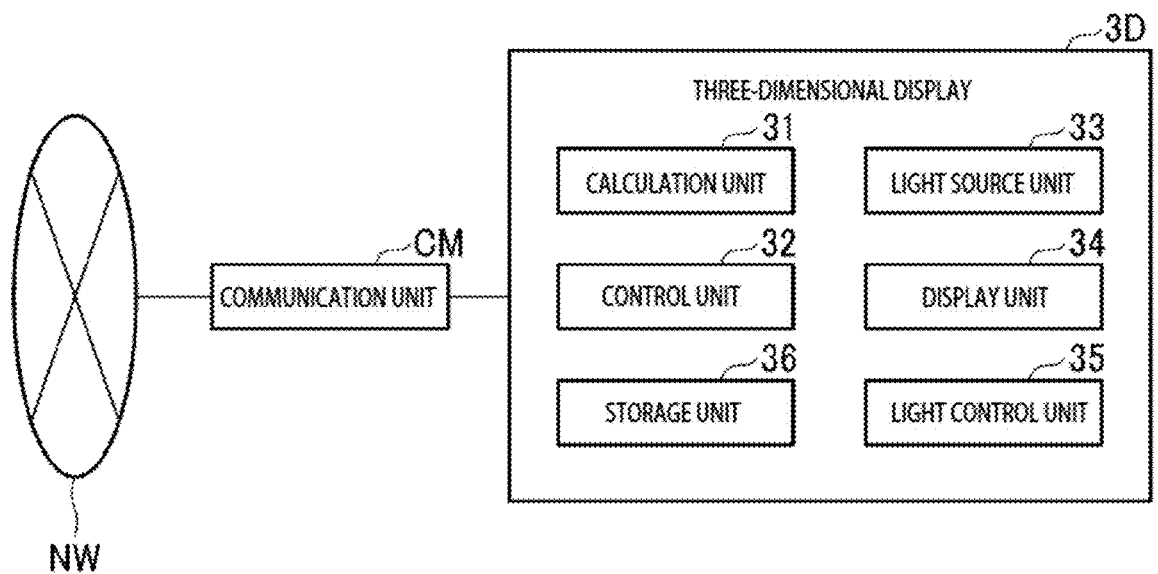
FIG. 34 is a block diagram illustrating a configuration of a three-dimensional spatial display system of a modified example of the embodiment.

FIG. 34 is a block diagram illustrating a configuration of a three-dimensional spatial display system 1SA of a modified example of the embodiment. The three-dimensional spatial display system 1SA includes, for example, the communication unit CM and the three-dimensional display 3D. That is, the present modified example can omit the stereoscopic camera SC.

The communication unit CM externally acquires three-dimensional information of a virtual object. The virtual object includes, not only the object to be observed, but also three-dimensional information of a space to be reproduced, such as a background. The three-dimensional display 3D may reproduce and display, for example, a space in which the virtual object is present in the range of the social distance SD, using the three-dimensional information of the virtual object acquired from the communication unit CM.

Alternatively, the three-dimensional display 3D may include a functional unit that generates three-dimensional information of a virtual object. Alternatively, the three-dimensional display 3D of the present modified example may use three-dimensional information of a virtual object pre-stored in the storage unit 36. In this case, the communication unit CM can be omitted in the three-dimensional spatial display system 1S.

Figure 35:
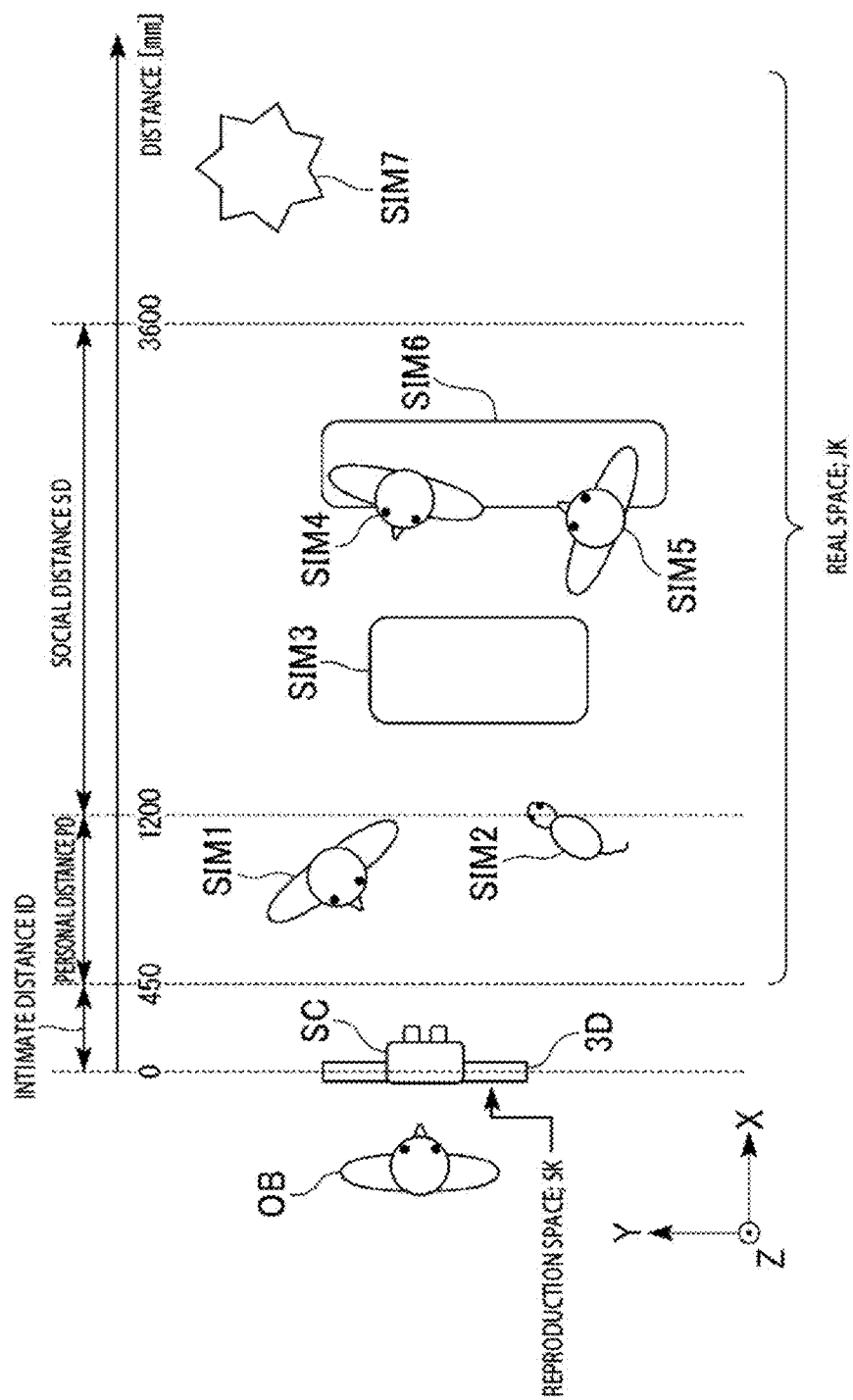
FIG. 35 is a diagram illustrating an example to which a three-dimensional spatial display system of a modified example of the embodiment is applied.

FIG. 35 is a diagram illustrating an example to which a three-dimensional spatial display system 1SA of a modified example of the embodiment is applied. In FIG. 35, a reproduction space SK in which three-dimensional images of virtual objects generated by the configuration shown in FIG. 34, for example, are present as reproduction images SIM (in this example, reproduction images SIM1 to SIM7) can be displayed on the display. Thus, the use of the three-dimensional display 3D of the present modified example enables more smooth communication with a non-existent partner, such as a person or a character created in a virtual space, or an avatar of a communication partner transmitted from another system, in a social distance space with a depth of the social distance SD.

The communication means in the present modified example is not limited to a specific means. For example, the three-dimensional spatial display system 1SA may be applied to a means for communicating with a character. The character described herein is a virtual character displayed as a virtual object.

In this case, the three-dimensional spatial display system 1S may include, for example, a live camera and a processor that performs signal processing for displaying an image of a three-dimensional space in which a character is made to show a predetermined reaction. The live camera captures an image of a user. The processor recognizes a gesture of the user from a video captured by the live camera, determines a reaction to be shown by the character based on the gesture, and displays an image of the character showing the determined reaction. Accordingly, it is possible to communicate with the character through the gesture.

Alternatively, the three-dimensional spatial display system 1SA includes a microphone, a speaker, and a processor that performs signal processing for displaying an image of a three-dimensional space in which a character is made to show a predetermined reaction. The microphone receives the user's voice. The processor determines a response to the voice according to the user's voice input from the microphone, and outputs the determined response from the speaker. Further, the processor determines a reaction to be shown by the character according to the user's voice, and displays an image of the character showing the determined reaction. Accordingly, it is possible to communicate with the character through the voice.

Further, in the present modified example, the virtual object may be a live action video captured in advance by a stereoscopic camera or the like, instead of CG (Computer Graphics). In this case as well, it is possible to interact (communicate) with the virtual object by switching the video to be reproduced as a reaction according to the user's input such as a gesture or a voice as described above.

Further, when a virtual object reproduced (displayed) by the three-dimensional spatial display system 1SA is a stationary object, the display unit 34 of the three-dimensional display 3D may display a stationary (still) image such as printed matter.

In addition, the image displayed by the display unit 34 of the three-dimensional display 3D may be an image in which a hologram pattern is drawn with a fine patterning device such as an electron beam lithography machine, or an image of a copy of the drawn hologram pattern. By using a fixed hologram pattern (still image) as an image to be displayed, it is possible to reproduce a large space at a low cost. In this case, the display unit 34 controls the direction of light using the hologram pattern. The display unit 34 displays the hologram pattern as at least either a virtual image or a real image by light beams emitted from the element cells C. Accordingly, the display function and the light control function are implemented by a single device. In such a case, the virtual character displayed as the virtual object cannot show a reaction, but can communicate with the virtual object by voice in a pseudo manner as described above. Further, in addition to the display unit 34, or instead of the display unit 34, the light control unit 35 can display a still image such as a fixed hologram pattern. The display unit 34 is an example of a "stereoscopic image display unit." The light control unit 35 is an example of a "stereoscopic image display unit." Further, the image in which a hologram pattern is drawn is an example of a "stereoscopic image." The image in which the drawn hologram pattern is copied is an example of a "stereoscopic image."

As described above, the three-dimensional display (light beam reproduction device) 3D of the present embodiment reproduces light beams virtually emitted from the stereoscopic image when reproducing the stereoscopic image in the reproduction space SK.

The three-dimensional display 3D of the present embodiment includes the display unit 34 and/or the light control unit 35. The display unit 34 and/or the light control unit 35 is an example of a "stereoscopic image display unit." The display unit 34 and/or the light control unit 35 displays a stereoscopic image as at least one of a virtual image and a real image by light beams emitted from respective element cells C contained in an element cell set composed of a plurality of element cells C arranged two-dimensionally corresponding to a reproduction screen. The display unit 34 and/or the light control unit 35 displays the stereoscopic image in a region at a depth distance corresponding to the social distance SD in the reproduction space SK. Further, in the three-dimensional display 3D, the size d of the element cell and the pitch p of the element cell are values determined according to the degree to which the stereoscopic image reproduced in the reproduction space SK is observed by the observer OB. The stereoscopic image is reproduced in a region at a depth distance corresponding to the social distance SD in the reproduction space SK.

Thus, the three-dimensional display 3D of the present embodiment can determine the size d of the element cell C and the pitch p of the element cell C so that the stereoscopic image located at the social distance SD in the reproduction space SK can be clearly seen by the observer OB. Therefore, the social distance space can be reproduced as a three-dimensional space with a natural sense of distance and less blur.

The three-dimensional display 3D of the present embodiment includes the calculation unit 31 and/or the control unit 32. The calculation unit 31 and/or the control unit 32 is an example of a "signal processing unit." The calculation unit 31 and/or the control unit 32 calculates the direction of the light beam to be reproduced for each element (element cell C) of the element cell set. The element cells C are two-dimensionally arranged corresponding to the reproduction screen. The element cells C are associated with respective elements obtained by dividing a set of the plurality of light beams emitted from a surface of the stereoscopic image according to the positions on the reproduction screen where the light beams reach. Accordingly, the same effect as that described above can be obtained.

In the three-dimensional display 3D of the present embodiment, the size d of the element cell C is determined according to the size of blur generated in the reproduced stereoscopic image. Since the size d of the element cell C is determined so that the size of blur is suppressed to be within the allowable range, it is possible to reproduce a stereoscopic image with less blur.

Further, the pitch p of the element cell C is determined according to the resolution of the retina of the observer OB observing the reproduced stereoscopic image. Since the pitch p of the element cell C is determined so that the focus can be adjusted, it is possible to reproduce a stereoscopic image which can be focused by the observer OB.

Further, the size d of the element cell C may be determined to be smaller than the pitch p of the element cell C. The size d of the element cell C may be 0.8 mm or more, and the pitch p of the element cell C may be 1.2 mm or less. With this configuration, it is possible to communicate without any practical problem in the display that displays the social distance SD.

Moreover, the element cell C may be a hologram in which a wavefront from a stereoscopic image is recorded.

All or part of the three-dimensional spatial display system 1S (1SA, 100S) and the three-dimensional display 3D described in the above embodiments may be implemented by a computer. In this case, programs for realizing the functions may be recorded on a computer-readable recording medium, and the programs recorded on the recording medium may be read and executed by a computer system. The "computer system" described herein includes an OS and hardware such as peripheral devices. The "computer-readable recording medium" refers to a storage device such as a portable medium, e.g., a flexible disk, a magneto-optical disk, a ROM, a CD-ROM or the like, or a hard disk incorporated in a computer system. Further, the "computer-readable recording medium" may include a medium that dynamically retains a program in a short period of time, such as a communication line that transmits a program through a network such as the internet or a telecommunication line such as a telephone line, or a medium that retains a program for a given period of time in that case, such as a volatile memory of a computer system that serves as a server or a client. The above programs may achieve part of the functions described above, or may achieve functions in combination with programs already recorded in a computer system, or may achieve functions by using a programmable logic device, such as an FPGA.

Some embodiments of the present invention have been described in detail with reference to the drawings. However, specific configurations should not be limited to these embodiments, and may also include designs and the like without departing from the spirit of the present invention.

The present application addresses the following. There is a need to display larger three-dimensional images using the above techniques. However, since diffraction patterns that diffract visible light have a fine structure of submicron order and are produced using an electron beam lithography machine or a laser lithography machine, the upper limit of size that can be produced at one time is 10 inches (diagonal of a rectangle) or less at present.

PTL 4 describes a method for producing a large-area diffraction pattern using a multi-surface master composed of a plurality of unit masters.

The multi-surface master has limited accuracy in alignment and positioning of the plurality of unit masters, resulting in misalignment of tens of μm to hundreds of μm. Even when transfer of the unit masters is repeated multiple times while changing the position, misalignment as described above is unavoidable.

Such misalignment is allowed when simply displaying a three-dimensional image, but in order to move a three-dimensional image or display a three-dimensional image in full color, it is required to align the diffraction pattern with the array pattern of color filters or liquid crystal pixels. From the perspective of improving display, such misalignment should be reduced to about 1/10 or less of the array pitch, but from the reasons described above, this is very difficult and almost impossible only by the method described in PTL 4.

Moreover, in conventional three-dimensional display devices capable of displaying moving three-dimensional images or color three-dimensional images, there is a problem that large blurring may occur due to the effect of diffraction when displaying a space with a depth that allows for an appropriate interpersonal distance (personal space).

In view of the above circumstances, an aspect of the present invention is to provide a diffraction sheet capable of achieving diffraction patterns arranged with high accuracy even in a large area.

Another aspect of the present invention is to provide a large-area three-dimensional display device capable of displaying moving three-dimensional images or color three-dimensional images, and provide a light beam reproduction device, a three-dimensional spatial display system, a light beam reproduction method, and a program capable of displaying a space with depth as a three-dimensional space with a natural sense of distance and less blur.

According to a first aspect of the present invention, a three-dimensional display device includes: a diffraction sheet including a transparent substrate, and a diffraction layer having a first diffraction pattern and a second diffraction pattern arranged in a first array pattern and a second array pattern on the substrate, respectively, the diffraction sheet measuring 10 inches or more in diagonal; and one of a liquid crystal device having a plurality of pixels and a color filter having two or more types of color filters.

In the three-dimensional display device, the first diffraction pattern and the second diffraction pattern are overlapped with the pixels or the color filters in a direction normal to the diffraction sheet with an amount of displacement being 1/10 or less of a pitch of the pixels or the color filters.

According to a second aspect of the present invention, a method for manufacturing a diffraction sheet includes: a step A of forming a first uncured resin layer on a transparent substrate measuring 10 inches or more in diagonal; a step B of bringing a first diffraction pattern formed on a first surface of a first plate into contact with the first uncured resin layer, the first diffraction pattern being formed in a rectangular area measuring 10 inches or more in diagonal; a step C of placing a first mask having a plurality of first apertures formed based on a first array pattern on the first plate, which is then irradiated with light to cure a portion of the first uncured resin layer that overlaps the first apertures; a step D of forming a second uncured resin layer on a surface of the substrate on which the first uncured resin layer is formed; a step E of bringing a second diffraction pattern, which is different from the first diffraction pattern, formed on a first surface of a second plate into contact with the second uncured resin layer, the second diffraction pattern being formed in a rectangular area measuring 10 inches or more in diagonal; and a step F of placing a second mask having a plurality of second apertures formed based on a second array pattern different from the first array pattern on the second plate, which is then irradiated with light to cure a portion of the second uncured resin layer that overlaps the second apertures.

According to a third aspect of the present invention, a diffraction sheet includes: a transparent substrate; and a diffraction layer having a first diffraction pattern arranged in a first array pattern on the substrate and a second array pattern arranged in a second diffraction pattern different from the first array pattern on the same side of the substrate as that having the first diffraction pattern, wherein the second diffraction pattern is thicker than the first diffraction pattern.

According to a fourth aspect of the present invention, a light beam reproduction device configured to reproduce light beams virtually emitted from a stereoscopic image when displaying the stereoscopic image in a reproduction space, the light beam reproduction device includes: a stereoscopic image display unit that displays the stereoscopic image as at least one of a virtual image and a real image by light beams emitted from element cells contained in an element cell set composed of a plurality of the element cells arranged two-dimensionally corresponding to a reproduction screen, wherein the stereoscopic image display unit displays the stereoscopic image in a region at a depth distance corresponding to a social distance in the reproduction space, and a size of each of the element cells in the element cell set and a pitch of the element cells arranged two-dimensionally are values determined according to a degree to which the stereoscopic image displayed in the reproduction space is observed by an observer. The degree to which the stereoscopic image is observed by an observer refers to a position or a range in which the stereoscopic image is displayed, a degree of blur allowed by the observer, or the like.

According to the above light beam reproduction device, it is possible to reproduce the social distance space as a three-dimensional space with a natural sense of distance and less blur.

According to the above aspects of the present invention, it is possible to achieve diffraction patterns arranged with high accuracy even in a large area.

This can contribute to realization of a large-area three-dimensional display device capable of displaying moving three-dimensional images or color three-dimensional images, and a light beam reproduction device, a three-dimensional spatial display system, a light beam reproduction method, and a program capable of displaying a space with depth as a three-dimensional space with a natural sense of distance and less blur.

REFERENCE SIGNS LIST 1, 1A, 1B, 2 . . . Diffraction sheet
10 . . . Substrate

20 . . . Uncured resin layer (first uncured resin layer)
20A . . . Uncured resin layer (second uncured resin layer)
20B . . . Uncured resin layer (third uncured resin layer)
21, 41 . . . First diffraction pattern
22, 22A, 42 . . . Second diffraction pattern
30, 30A, 40A . . . Diffraction layer
40 . . . Color filter
51, 52 . . . Three-dimensional display device
100 . . . First plate
100a . . . First diffraction pattern
110 . . . First mask
110a . . . Aperture (first aperture)
200 . . . Second plate
200a . . . Second diffraction pattern
210 . . . Second mask
210a . . . Aperture (second aperture)
LC . . . Liquid crystal device
1S, 1SA, 100S . . . Three-dimensional spatial display system
CM . . . Communication unit
SC . . . Stereoscopic camera
3D . . . Three-dimensional display (light beam reproduction device)
31 . . . Calculation unit (signal processing unit)
32 . . . Control unit (signal processing unit)
33 . . . Light source unit
34 . . . Display unit (stereoscopic image display unit)
35 . . . Light control unit (stereoscopic image display unit)
36 . . . Storage unit
C . . . Element cell
OB . . . Observer
SD . . . Social distance
d . . . Size of element cell
p . . . Pitch of element cell Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a diffraction sheet, comprising:
    forming a first uncured resin layer on a transparent substrate measuring 10 inches or more in diagonal;
    bringing a first diffraction pattern formed on a first surface of a first plate into contact with the first uncured resin layer, the first diffraction pattern being formed in a rectangular area measuring 10 inches or more in diagonal;
    placing a first mask having a plurality of first apertures formed based on a first array pattern on the first plate;
    irradiating the first mask with light to cure a portion of the first uncured resin layer that overlaps the first apertures;
    forming a second uncured resin layer on a surface of the transparent substrate on which the first uncured resin layer is formed;
    bringing a second diffraction pattern, which is different from the first diffraction pattern, formed on a first surface of a second plate into contact with the second uncured resin layer, the second diffraction pattern being formed in a rectangular area measuring 10 inches or more in diagonal;
    placing a second mask having a plurality of second apertures formed based on a second array pattern different from the first array pattern on the second plate; and
    irradiating the second mask with light to cure a portion of the second uncured resin layer that overlaps the second apertures, wherein
    the first uncured resin layer has a cured hardness of 0.5 MPa to 100 GPa at room temperature.

2. The method according to claim 1, wherein the forming of the second uncured resin layer produces the second uncured resin layer thicker than the first uncured resin layer.

3. The method according to claim 2, wherein the second uncured resin layer and the first uncured resin layer have a difference in thickness which is larger than or equal to a height of the second diffraction pattern.

4. The method according to claim 1, wherein at least one of the first plate and the second plate has a release layer on the first surface.

5. The method according to claim 4, wherein the release layer includes, as a main component, at least one of a thermosetting resin, silicone, a fluorine-based resin, and a polymer having an alkyl group.

6. A diffraction sheet, comprising:
    a transparent substrate; and
    a diffraction layer having a first diffraction pattern formed in a first array pattern on a first resin layer of the transparent substrate and a second diffraction pattern formed in a second array pattern on a second resin layer different from the first array pattern on a same side of the transparent substrate as the first diffraction pattern,
    wherein the second diffraction pattern is thicker than the first diffraction pattern,
    the diffraction sheet has a rectangular shape in a plan view measuring 10 inches or more in diagonal, and
    the first resin layer has a cured hardness of 0.5 MPa to 100 GPa at room temperature.

7. The diffraction sheet according to claim 6, wherein the second diffraction pattern and the first diffraction pattern have a difference in thickness which is larger than or equal to a height difference between surface concavities and convexities of the second diffraction pattern.

8. The diffraction sheet according to claim 6, wherein the second diffraction pattern and the first diffraction pattern have a difference in thickness of 100 nm-10 μm.

9. The diffraction sheet according to claim 6, further comprising:
    a color filter including a plurality of color filters and positioned between the first and second diffraction patterns and the transparent substrate,
    wherein the first and second diffraction patterns have displacement relative to the plurality of color filters in a plan view in an amount of 1/10 or less of a pitch of the plurality of color filters.

10. The diffraction sheet according to claim 6, wherein the first diffraction pattern and the second diffraction pattern include a color material, and
    the diffraction layer is a color filter.

11. The diffraction sheet according to claim 6, wherein the first diffraction pattern and the second diffraction pattern have a gap of 1 μm-100 μm.

* * * * *